(12) United States Patent
Paraskevakos

(10) Patent No.: US 7,454,049 B2
(45) Date of Patent: Nov. 18, 2008

(54) SYSTEM AND METHOD FOR INTELLIGENT CURRENCY VALIDATION

(75) Inventor: Theodore G. Paraskevakos, Towson, MD (US)

(73) Assignee: iCVn, Inc., Timonium, MD (US)

( * ) Notice: Subject to any disclaimer, the term of this patent is extended or adjusted under 35 U.S.C. 154(b) by 0 days.

(21) Appl. No.: 11/407,962

(22) Filed: Apr. 21, 2006

(65) Prior Publication Data

US 2007/0172106 A1    Jul. 26, 2007

Related U.S. Application Data

(60) Provisional application No. 60/673,374, filed on Apr. 21, 2005.

(51) Int. Cl.
*G06K 9/00* (2006.01)
(52) U.S. Cl. ........................ 382/135; 382/218
(58) Field of Classification Search ......... 382/135–140, 382/209, 218, 306; 235/379; 902/7–8, 10–16, 902/18; 340/5.86, 5.9; 705/39–40, 42–44
See application file for complete search history.

(56) References Cited

U.S. PATENT DOCUMENTS

| 5,616,902 | A | * | 4/1997 | Cooley et al. ............... 235/380 |
|---|---|---|---|---|
| 6,065,672 | A | * | 5/2000 | Haycock ..................... 235/379 |
| 6,109,522 | A | | 8/2000 | Force et al. .................. 235/379 |
| 6,131,718 | A | * | 10/2000 | Witschorik .................. 194/206 |
| 6,145,738 | A | * | 11/2000 | Stinson et al. ............... 235/379 |
| 6,317,650 | B1 | * | 11/2001 | Powell et al. ................ 700/236 |
| 6,550,671 | B1 | * | 4/2003 | Brown et al. ................ 235/379 |
| 6,603,871 | B2 | | 8/2003 | Liang ......................... 382/135 |
| 6,661,910 | B2 | * | 12/2003 | Jones et al. .................. 382/135 |
| 6,783,061 | B2 | | 8/2004 | Graef et al. .................. 235/379 |
| 2002/0194124 | A1 | * | 12/2002 | Hobbs et al. .................. 705/39 |
| 2003/0210386 | A1 | | 11/2003 | Laskowski ..................... 356/71 |
| 2004/0232217 | A1 | * | 11/2004 | Graef et al. .................. 235/379 |
| 2004/0255354 | A1 | | 12/2004 | Graef et al. ..................... 902/8 |

* cited by examiner

*Primary Examiner*—Daniel G Mariam
(74) *Attorney, Agent, or Firm*—Pillsbury Winthrop Shaw Pittman LLP

(57) ABSTRACT

Currency is validated by comparing identifying information extracted from the currency, such as a serial number associated with the currency, to identifying information in a list corresponding to invalid currency, such as counterfeit currency. If the extracted identifying information matches identifying information on the list, the currency is deemed invalid. A photograph or thumbprint image can be obtained by a person using the invalid currency to help in later identification of that individual. Optical character recognition techniques can be used to extract the identifying information.

25 Claims, 16 Drawing Sheets

MEMORY

E 0000001
TO
E 6003500  = 5 $ OR €

S 1001000
TO
S 5000100  = 10 $ OR €

F 700200
TO
F 900000  = 10 $ OR €

F 900001
TO
F 9999999  = 20 $ OR €

ABC 0000000
TO
ABC 9999999  = 50 $ OR €

FIG. 3

SYSTEM AND METHOD FOR INTELLIGENT CURRENCY VALIDATION

The present invention claims the benefit of U.S. Provisional Application No. 60/673,374, filed Apr. 21, 2005, which is hereby incorporated by reference in its entirety.

BACKGROUND OF THE INVENTION

Since the advent of paper money, counterfeiting is a major concern. The ability of individuals or organizations to generate and pass counterfeit currency can have devastating effects on businesses and nations. Tools available to authorities charged with fighting counterfeiting have advanced such that counterfeiting by amateur and/or unorganized groups has been largely eliminated.

However, advances in technology, such as scanners, color laser printers and image processing through PCs, are beginning to tip the scales in favor of the counterfeiters again. This is especially true where the counterfeiters are large, organized groups. In extreme cases, such counterfeiting can lead to destabilized economies or dangerous situations. For example, extremist groups can use counterfeiting to procure weapons for terrorist activities. In another example, a country may try to destabilize the economy of an enemy by introducing large sums of counterfeit currency to its enemy's economy. Further, counterfeiting occurrences are becoming more difficult to detect. For example, today, counterfeit bills can be made to look and feel authentic. This is because they often use the same printing device, paper, ink, and other technology as used for printing legitimate currency. As a result, often, the only limitation on such organized counterfeiters is that they cannot invent new serial numbers. Consequently, they must use the same (duplicate) serial numbers as legitimate currency. Consequently, a manner for detecting occurrences of counterfeiting and the identity of the counterfeiters is required.

SUMMARY OF THE INVENTION

Embodiments of the present invention provide a system and method for identifying instances of counterfeiting as well as the counterfeiters themselves. In one embodiment of the present invention, this is accomplished using unique identifying information associated with the money. For example, the unique identifying information can be the serial number associated with the currency.

Embodiments of the present invention can be used in numerous applications. For example, embodiments of the present invention can be used in conjunction with conventional currency counting devices, unique identifying information is extracted from the currency as it is counted. A special purpose printer can be added to print the extracted unique identifier on the securing tape of a currency bundle when stacks of currency are bundled. This prevents a counterfeiter, for example, a cashier from replacing the money with counterfeit money. Other embodiments of the present invention include drawerless cash registers (DCRs), automatic tellers (ATMs), local currency-to-foreign currency exchange machines, utility bill pay machines (UBPM), pay bill machines, and money/check/credit vending machines (VM) to name a few. Embodiments of the present invention can also be used in other applications, as described below.

Embodiments of the present invention include a currency imaging system. The currency imaging system comprises a couple charge device (CCD). Such CCDs, for example, can be similar to ones readily found in scanners used for transferring pictures and images to a personal computer (PC). The image recognition system can further comprise optical character recognition (OCR) software. In an embodiment of the present invention, the OCR software recognizes and electronically stores the serial number of the currency. The currency imaging system of embodiments of the present can also include an element (ICON). ICON depicts the entire surface of the paper currency. Either both or select portions of the currency can be depicted. Moreover, using a scanner's software ability to magnify an image, tiny specific details that are generally unobservable with the naked eye can be isolated or selected. These small detail areas can be compared to identify information corresponding to the existing real currency.

OCR software of embodiments of the present invention can be used to extract unique identification information from the currency. This unique identifying information can include denomination numbers, serial numbers, left and right series numbers, printing numbers, issuing bank numbers, date of printing, treasury and secretary signatures, or any other number, letter, icon, or identifying information to help verify the authenticity of the currency. As described below, using the unique identifying information, embodiments of the present invention can determine whether currency is legitimate or counterfeit.

In addition to extracting unique identification information from the currency, an electronic ID (TAG) can be added to every bill passed through an embodiment of the present invention. The tag can identify country, time, special place where transaction occurs, or whether the specific bill was a part of a bigger amount or if it was passed alone.

Embodiments of the present invention can also include an ultra-violet light. The ultra-violet light is used to detect ink color and paper quality. Further, with the appropriate back lighting, the ultra-violet light can be used to recognize watermarks.

In addition, embodiments of the present invention can include a magnetometer. Use of magnetometers allows detection of metallic lines (wires) imbedded between the paper layers. From such magnetic properties, embodiments of the present invention are able to discern between a metallic element placed in real currency and an ink line used by unsophisticated counterfeiters. Some embodiments of the present invention can also read magnetic inks.

The ability to digitize and recognize serial numbers associated with currency offered by embodiments of the present invention provides an important application for an embodiment of the present invention, since the serial numbers of the currency can be compared in the system's memory with an existing list of available serial numbers arranged by denomination and/or issuing date supplied by the country's treasury or appropriate department. In this manner, an embodiment of the present invention can determine the denomination simply by the existence of that serial number on the supplied list.

Further, serial numbers obtained from the under-investigation currency can be compared with other lists of serial numbers. Such lists include, for example, lists of serial numbers for currency representing stolen serial numbers, fraudulently obtained serial numbers, serial numbers used by special agencies, for example narcotic agencies, to trace the path of currency recipients from the result of a "sting" or surveillance activity, money destroyed by the treasury department due to age, being voided or canceled, or other reasons. Based on the comparison, whether the under-investigation currency is authentic or counterfeit can be determined.

Such lists of serial numbers could be entered into a system according to an embodiment of the present invention, and stored on any storage medium, including, ROM, PROM, EPROM or any other magnetic or optical storage media, including, hard disk, soft disk, and CDROM. The lists can be bi-directionally transferred through any communication links including, for example, a modem and a telephone line or cable TV, satellite communication, radio, Network P/C or any another communication system that can transfer such lists.

Embodiments of the present invention can be operated manually or automatically. For example, in a manual embodiment of the present invention, an operator is instructed to undertake one or more scheduled actions. In an automatic embodiment of the present invention the system performs the actions automatically.

Further, in an embodiment of the present invention, a hidden camera is configured to automatically photograph a patron when the currency used by the patron fails authentication. Alternatively, or in addition to the photograph, the patron can be prompted to push a specific button. Coupled to the button is a special camera to record the patron's fingerprint or part thereof when the currency used by the patron fails authentication, when the button is pressed and to go forward to other activities that have been pre-programmed.

Embodiments of the present invention store locally one or more serial (or other identification) numbers of scanned currency in optical, magnetic or any other storage medium. For example, where an embodiment of the present invention is installed in a bank, super market or any other establishment in which money can be exchanged, the serial numbers corresponding to each incoming bill is extracted and stored. The serial numbers can also be transmitted through a communication link to a proper authority at a predetermined time.

Alternatively, for example, in the case of an unlawful action (such as a robbery), the numbers of the bills can be transmitted to a central processing authority. The central processing authority can group the serial numbers into a "blacklist." The blacklist can be distributed to one or more other nodes in a network so the nodes can take appropriate action. In this manner, the stolen money can be rendered unusable to perpetrators. For example, in an embodiment of the present invention, if currency having a serial number on a blacklist is used, an alarm or other notification is provided. This action can lead to apprehension of the perpetrator.

Use of blacklists may benefit society financially and socially. For example, in addition to immediate notification of attempts to pass invalid currency, blacklists can impose impediments to using money in drug trafficking, money laundering operations, and even help prevent tax evasion.

Installation of a network according to an embodiment of the present invention can be structured as a pyramid. At the top of the pyramid is a Central Bank. The central bank includes counterfeiting control services. The counterfeiting control services can compare currency identifying information (e.g., serial numbers) regularly for evidence of invalid information such as a duplicate serial number. The counterfeiting control service of the Central Bank is connected with a lower level. The lower level can include, for example, the banks of a particular country. For example, if the system is installed in the European Union, the lower level may include the banks of a particular European country. E. U. central banks obtain currency identifying information from the other bank's branches, which function in their countries.

Consequently, if a counterfeiting event is detected, the central banks of each country are contacted immediately, or through their branches, with the units that exchange money. Such unit include Public Funds, Booking Office, Post Offices, Airports, Department Stores, casinos, entertainment centers.

The birth of the euro is an ideal time to create and establish a currency validation system according to an embodiment of the present invention. One reason is that a huge number of cash registers need to be changed. That need provides businesses with an opportunity to choose cash registers configured to validate currency according to an embodiment of the present invention. Existing cash registered could be retrofitted to practice an embodiment of the present invention. Alternatively, new cash registers configured to practice an embodiment of the present invention could be procured.

The participating country members will benefit from implementations of embodiments of the present invention because it will minimize loss from counterfeiting, and, as a result, robberies, blackmailing, tax evasion, etc. Moreover, the system will create job positions for the operators of the system and for the manufacturing and maintenance.

BRIEF DESCRIPTION OF THE DRAWINGS

FIG. 3 is a memory allocation structure according to an embodiment of the present invention.

DETAILED DESCRIPTION OF THE INVENTION

Figure 1:
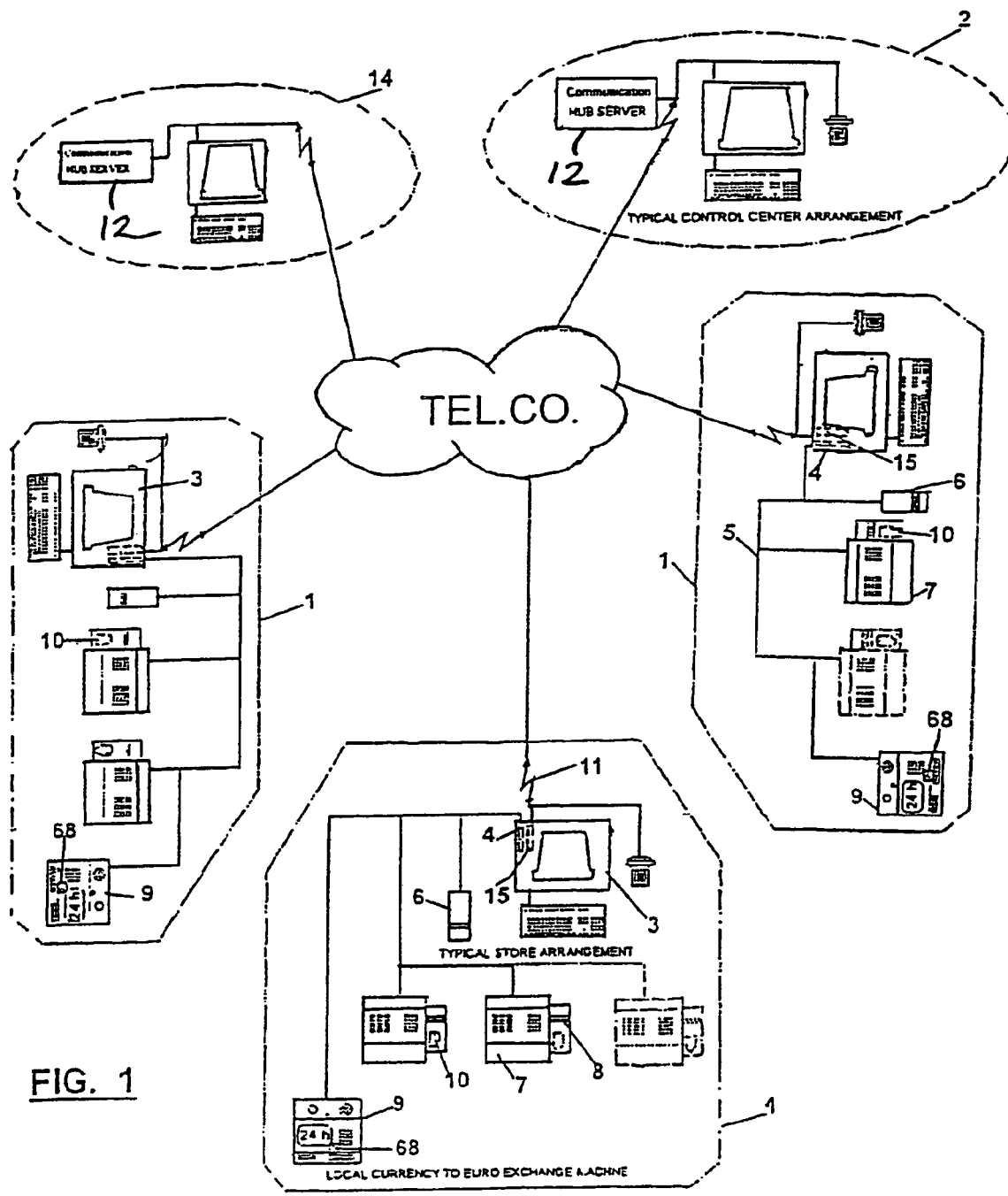
FIG. 1 is a schematic diagram of a network in a system according to an embodiment of the present invention.

FIG. 1 is a schematic diagram of a network for validating the authenticity of paper money according to an embodiment of the present invention. The network includes several local store arrangements, such as store arrangements 1, store arrangements 1 are coupled to a Central Unit such as Central Unit 2. The coupling can be over any communication link, including for example, land line or air interface. For example, as shown in FIG. 1, the coupling is through the telephone company via mobile or dial-up telephone line 11.

Preferably, data transmissions from and to central unit 2 are encrypted. Such encryption is well known to those skilled in the art. An example of suitable encryption is described in U.S. Pat. Nos. 4,241,237 and 4,455,453, each of which is hereby incorporated by reference in its entirety.

Each store arrangement I includes a local CPU 3. Local CPU 3 includes a resident LAN Card 4 connected via twisted pair or coaxial wires to a currency reading and authenticating currency device (RAD) 6. Currency RAD 6 is connected with a money collecting device 7. Money collecting device 7 can be any device for collecting money, including, for example, cash registers. Currency RAD 6 includes an internal video camera 10 and a currency input port 8.

Store arrangement 1 can include one or more currency exchange machines such as Euro to Local Currency Exchange Machines 9 coupled to CPU 3. CPU 3 is connected internally or externally with a MODEM 15, which is connected with a telephone line or with any other means to connect the system with central office/processing unit 2.

Central office/processing unit 2 includes a communication hub server 12. Communication hub server 12 is coupled through a communication link to a local CPU 3. Communication hub server 12 is further connected to a printer. In addition, communication hub server 12 is connected through telephone network with one or more higher level centers 14. The one or more higher level centers 14 are connected to the higher-level central office/processing units (2) or even the peak of the pyramid structure of the network topography illustrated in FIG. 1.

Figure 9:
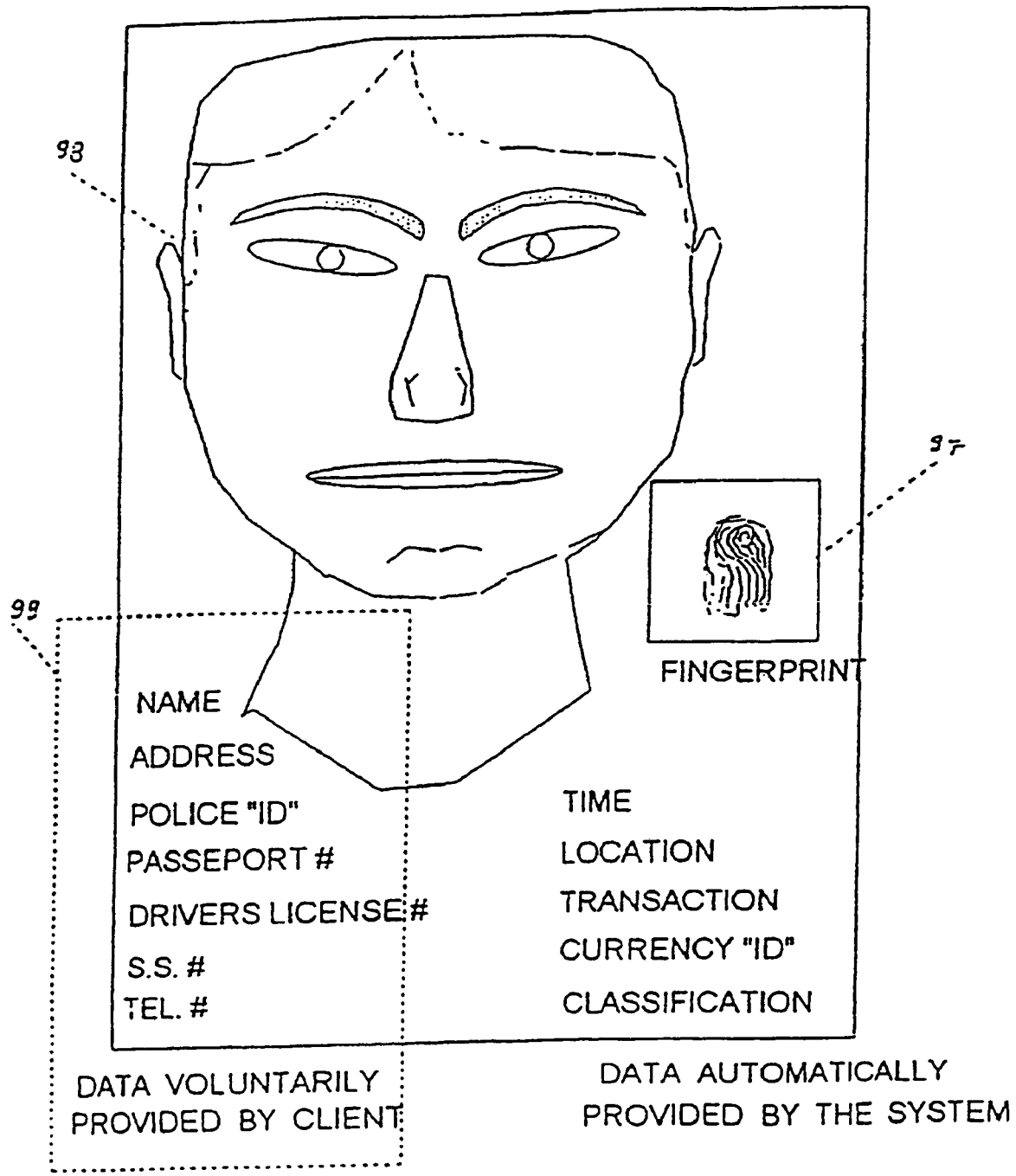
FIG. 9 is an exemplary screen shot of a video screen according to an embodiment of the present invention.

In operation, one embodiment of the present invention operates as follows. A cashier of a business receives currency from a patron. The business can be any business where currency may be used in a transaction including banks, supermarkets, department stores, retail outlets or any other such business. When the currency is received the cashier places the money in a currency input 8. The currency is placed in currency input 8 such that unique identification information (e.g., serial numbers) associated with the input currency can be obtained. For example, serial numbers can be obtained by digitizing the serial numbers and processing the digitized serial numbers using OCR software. The digitized serial numbers are transmitted through lines 5 and LAN card 4 and are stored in the memory of the CPU 3. If the patron enters the currency directly into currency input 8, the same procedure will be followed to digitize, OCR process and store serial numbers associated with the In an embodiment of the present invention, at pre-determined time intervals, CPU 3 communicates with local hub server 12 to send local hub server 12 all stored serial numbers. If during operation CUP 3 receives the same serial number more than once or determines that a serial number is on a blacklist, the system will invoke an appropriate program response. For example, in one embodiment of the present invention, the system will cause a picture of the patron to be taken and recorded, and will send instructions to the cashier and other authorized personnel. The picture of the patron is saved along with other data. The type of data saved according to one embodiment of the present invention is illustrated in FIG. 9. The data is then transmitted to the central office/processing unit 2 for further action.

The system responds in a similar manner if the CPU 3 determines that a received serial number belongs to a "list" of invalid numbers. The invalid numbers may correspond to stolen money, money known to be from drug traffic, counterfeit, or other invalid money.

In the case of illegal activity, such as an armed robbery, a cashier will be forced to surrender currency to a perpetrator. According to one embodiment of the present invention, soon after the perpetrator leaves, CPU 3 transmits all serial numbers of the stolen money to hub server 12. Hub server 12 receives the serial numbers of the stolen money, and groups the list of stolen numbers in a blacklist. Hub server 12 transmits the blacklist to each CPU in its branches of the network as well as each central office/processing unit 14 of a higher level of the network. If the stolen money is used, the serial number will match a serial number in the blacklist. When such a match occurs, the system records a picture of the party trying to use the currency corresponding to the matching serial numbers and follow the appropriate action plan. A similar procedure is followed if the money comes from a "sting" operation such as narcotics surveillance. In such a case, serial numbers associated with money to be used in the "sting" are placed in a redlist (which is used in a similar manner to the blacklist described above) and employees follow the appropriate programs.

Figure 2:
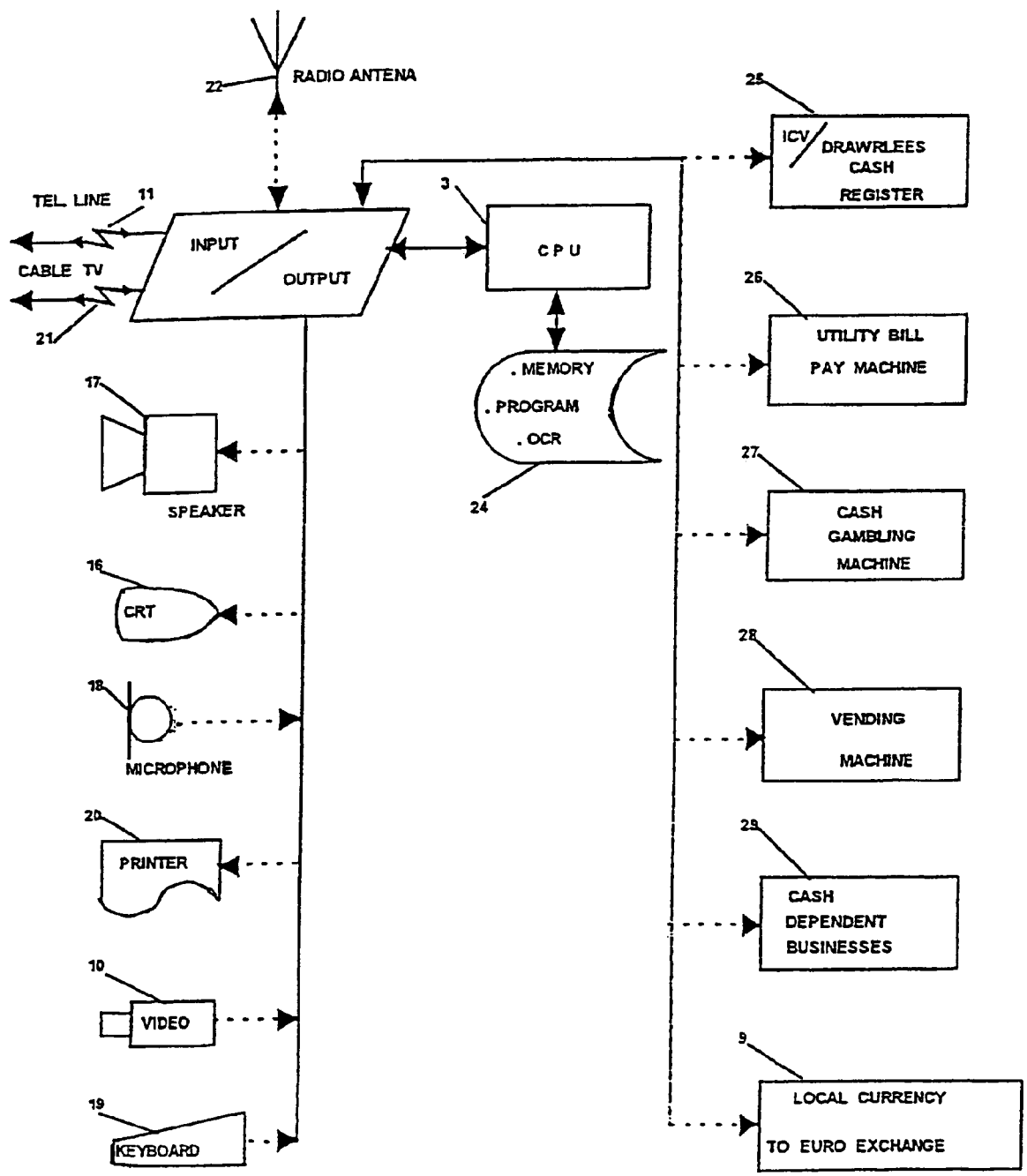
FIG. 2 is a block diagram of a system according to an embodiment of this invention.

FIG. 2 is a block diagram of a system according to an embodiment of the present invention. An exemplary customer interface is shown on the left hand side of the diagram. The customer interface can include a CRT monitor 16 to provide messages for the operator, a loudspeaker 17 to provide messages for the operator, a microphone 18, a video camera 10, a keyboard 19, and a printer 20 to print hard copies of receipts.

FIG. 2 also illustrates common communications links such as: telephone line 11, cable TV 21, AM-FM radio-satellite reception antenna 22. Any existing or future bidirectional communications link can be used.

The input/output devices are connected bi-directionally with the intelligent currency validator and other applicable devices such as:

1) Drawerless Cash Register 25;
2) Utility bill pay machine (UBPM) 26. A patron inserts a utility bill to be paid in an appropriate entrance slot of UBPM 26. The system recognizes the bill and the amount to be paid and instructs the patron to insert the paper currency in the proper currency input slot. UBPM 26 and then determines the authenticity of the currency. If the currency is authentic, UBPM 26 stamps the bill as a "paid";
3) Cash Gambling Machines (CGM) 27. CGMs dispense gaming tickets, for example, lottery tickets, such as LOTTO, PROTO, XISTO, and Pick Five. AN embodiment of the present invention can be retrofit for use in an existing CGM or incorporated in a new CGM;
4) Vending Machines (VM) 28.
5) Cash Dependent Businesses 29. Casinos, banks savings and loans, and any other business that can handle large amounts of money will benefit from the installation of the proposed system because it helps protect the business from counterfeit losses and from robberies;
6) Local Currency to Euro Exchange Machine 9. Patrons exchange the local currency to a new euro, in a operation such as explained below. In one embodiment of the present invention, an exchange machine embodiment of the present invention is similar to an ATM. Such an exchange machine embodiment of the present invention dispense cash as well as provides all the other options which an ATM offers.

The ability to read serial numbers allows an embodiment of the present invention to offer a "secure cash" service. "Secure cash" is similar to travelers' checks, but eliminates the hassle of signing and carrying separate pieces of paper (checks). Thus, "secure cash" permits cash to be reimbursed to a patron if his cash is lost or stolen. In operation, when a patron obtains cash from a cash dispensing machine such as an ATM or currency exchange machine, the cash dispensing machine offers the patron the an option to use the secure cash service. If the patron accepts the offer, the system dispenses the requested cash. In addition, a printer included in the cash dispensing machine prints the serial numbers associated with the dispensed cash on a receipt that is provided to the patron along with the requested cash. The patron can use the receipt to be reimbursed if cash is lost or stolen. A fee can also be deducted from the patron's account for use of the secure cash service. After dispensing the requested cash and printing the serial numbers on the receipt, the cash dispensing machine enters serial numbers associated with the dispensed cash numbers in a secure cash list. Each time patron uses secure cash in an establishment configured with one or more RADs (described above), serial numbers associated with used secure cash are subtracted from the secure cash list. If the patron loses his money, upon reporting the loss, the administrator of the system enters the serial numbers which have not been used, to a wanted cash list. Whenever this "wanted" cash resurfaces, authorities can follow set procedures to recover it. Further, the rules and regulations for the travelers' checks and fraudulent claim loss penalties, can be applied for the "Secure" cash.

FIG. 3 illustrates a memory allocation structure according to an embodiment of the present invention. As shown in FIG. 3, the memory can be partitioned into ranges of addresses corresponding to particular currency denominations. In particular, in a first address of the memory, the beginning of the issuing serial numbers for a particular currency denomination is stored. In a second address of the memory, the end of the issuing serial numbers for a particular currency denomination is stored. In a third address of the memory, the denomination of the currency, e.g., 5euro, can be stored. Other address ranges can be used to store similar information for other currency denominations.

Between the beginning and the end of each currency issuing lot are placed all the numbers which are unacceptable, e.g., numbers which are canceled due to overuse, being destroyed, or belonging to certain lists, for example, blacklists or redlists described above. In this manner, the use of available memory can be limited as much as possible. Further, any commercial memory supporting software available in the market can be used.

Figure 4:
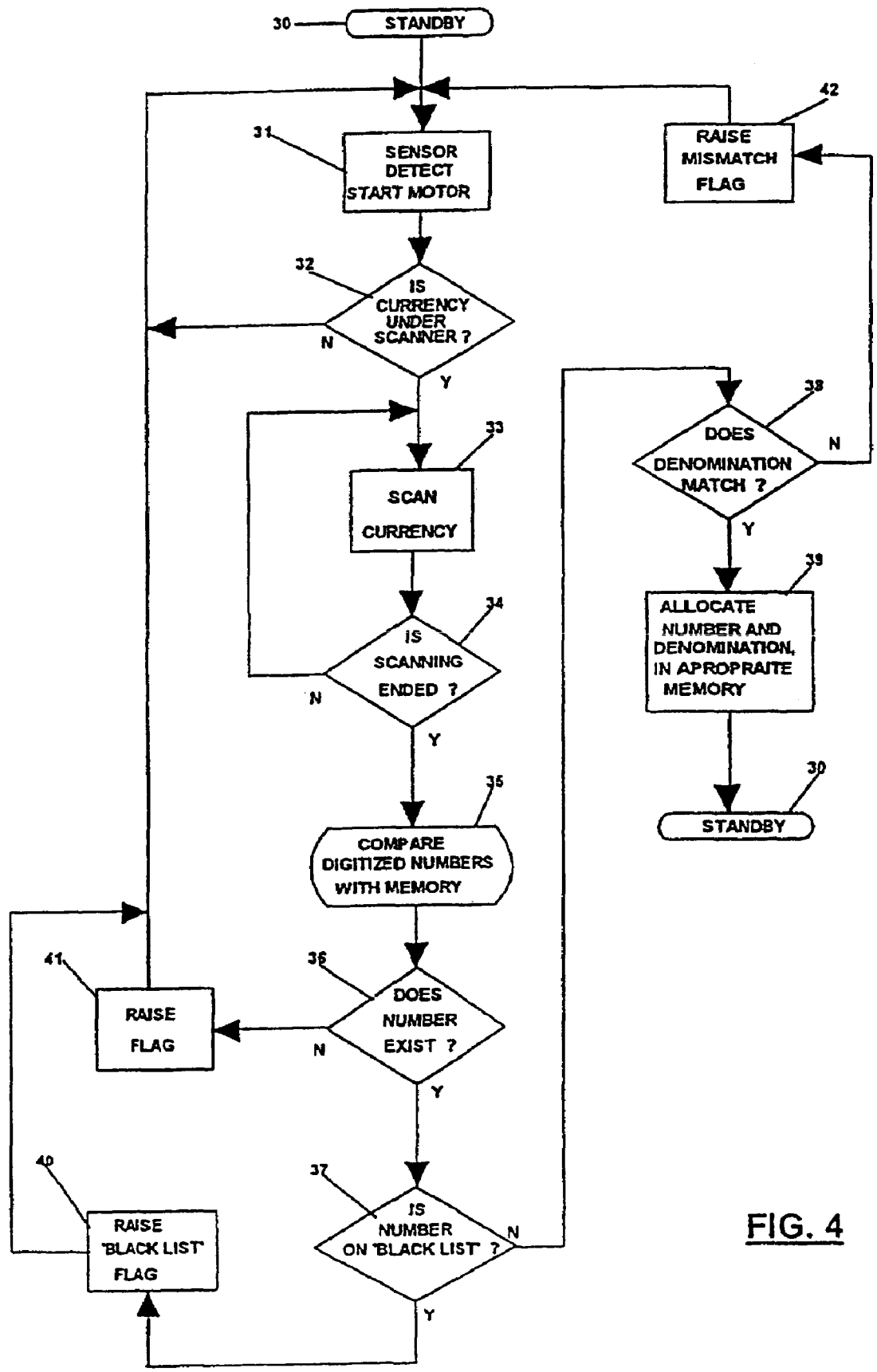
FIG. 4 is a logic flow diagram for system's software according to an embodiment of the present invention.

FIG. 4 is a flow chart for validating currency according to an embodiment of the present invention. Initially, the system is in a standby condition 30. When an entrance sensor 31 triggers, an order is given to start a paper money entrance motor 33. When the currency passes under a scanner 32, identification information such as the serial number associated with the currency 33 is read. For purposes of the present description, the identifying information is assumed to be the serial number associated with the currency. After the serial number is read 34, the read serial number is compared with a list in a memory 35. If the serial number associated with the currency exists 36, the number is searched in a blacklist 37. If the serial number is not in the blacklist, the serial number of the currency is compared to a list of serial numbers for the denomination of the currency 38. If the serial number is appropriate for the particular denomination of the currency under investigation, the serial number and denomination are stored in a suitable memory 39. The system then returns to the standby 30 state.

If on the other hand, the read serial number is in a list; a flag is raised 40 the system then returns to start point 30. Similarly, if the number isn't in the memory 41, the denomination of the currency does not match the serial number 42, or the system determines the currency is invalid for some other reason, a suitable subroutine is initiated to take the proper action.

Figure 5:
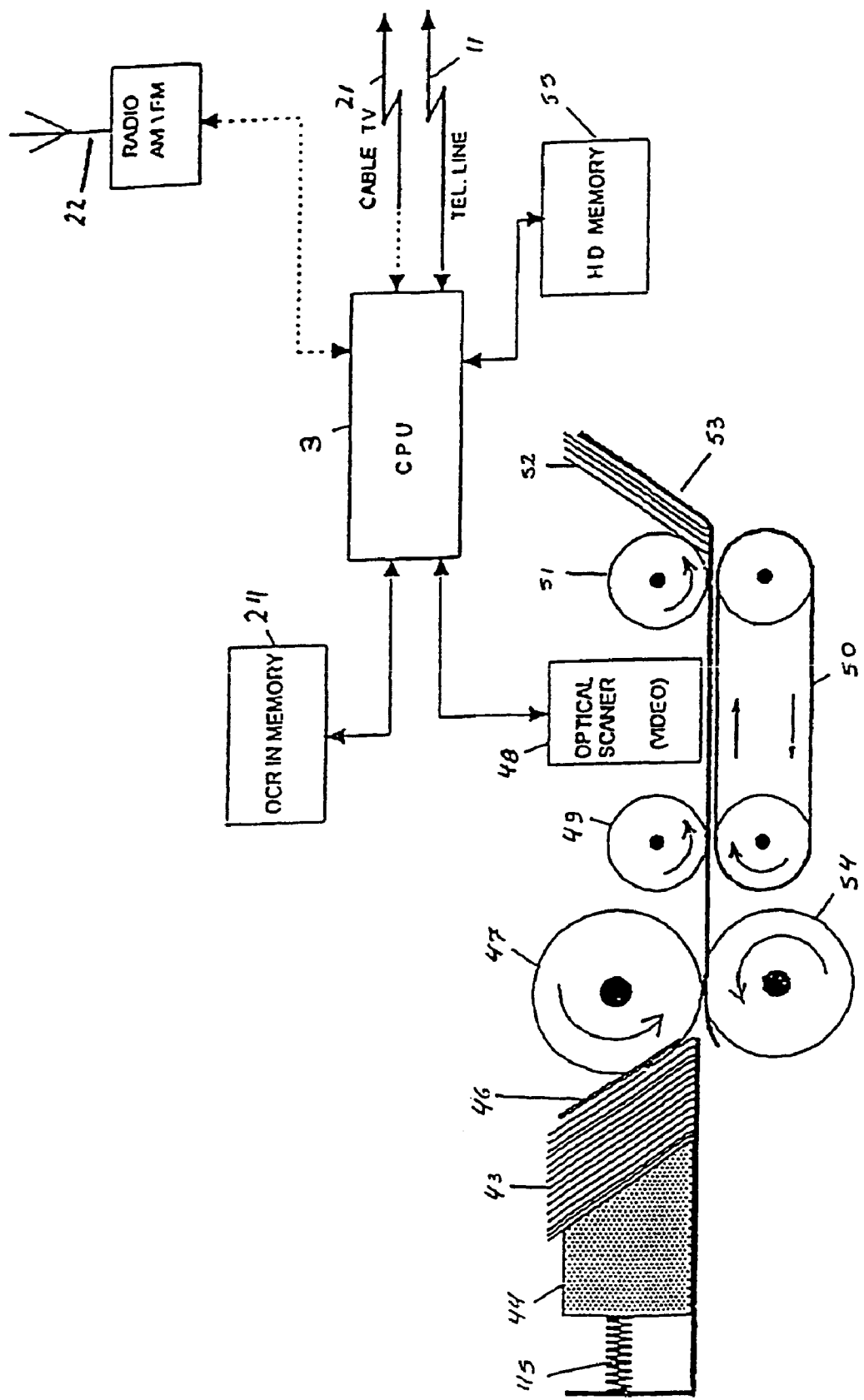
FIG. 5 is an exemplary embodiment of block diagram of a system according to an embodiment of the present invention.

FIG. 5 is a schematic diagram of an exemplary intelligent currency: validation system according to an embodiment of the present invention, in which stacked currency 43 is placed by an operator into the currency input, such as a currency input port. The currency input includes a retainer plate 46 and a spring 45 loaded pressure plate 44. Upon the detection of the presence of the currency by currency detection sensors, intake wheel 47 moves the first bill of the stacked currency 43 to the appropriate rollers 49 assisted by a belt system 50. A counter-direction ruffle cylinder 54 prevents a second bill from being inserted into the mechanism, thereby allowing only the top bill of the stack to go through the optical scanner 48. Optical scanner 48 contains its own light source. Optical scanner 48 scans the bill to obtain an image of the bill. The image from optical scanner 48 is transferred to CPU 3. CPU 3 processes the image using an OCR program stored in memory 24 to obtain identifying information associated with the bill. For example, the identify information can be a serial number associated with the bill. CPU 3 compares the serial number from the scanner with available serial numbers stored in a memory 55. Upon successful comparison, CPU 3 issues a command to store that successful transaction into memory 55, until transfer by the communication link to a central office/processing unit.

Figure 6:
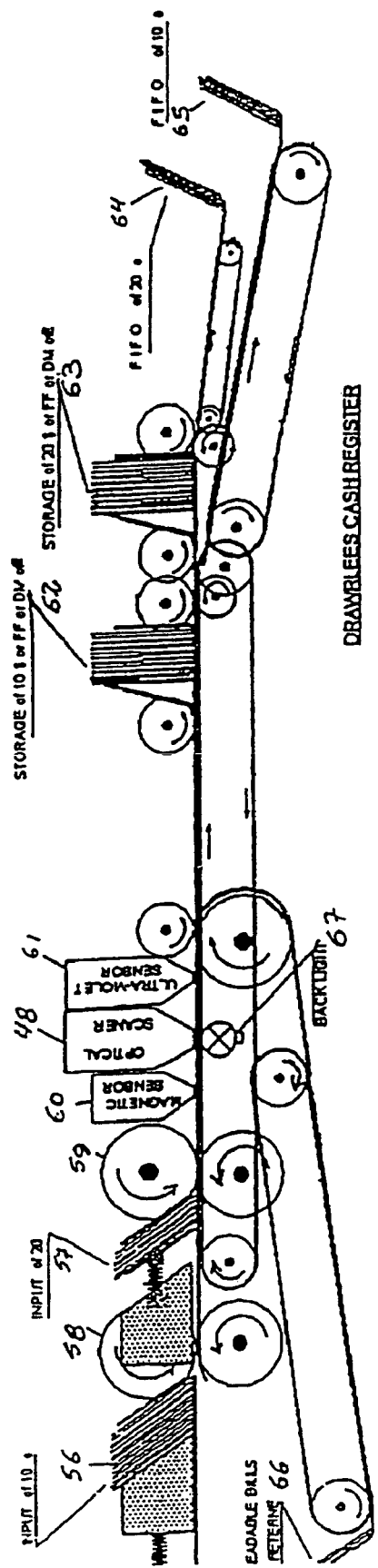
FIG. 6 is a schematic diagram of a Drawerless Cash Register according to an embodiment of the present invention.

FIG. 6 is a schematic diagram of a drawerless cash register (DCR) 25 according to an embodiment of the present invention. More specifically, currency entry ports 10 and 20 allow a cashier to place a stack of currency 56 and 57 in DCR 25 according to their denomination. The currency is advanced forward by rubber wheels 58 and 59 and forced to pass under a magnetic sensor 60, optical scanner 48 and an ultra-violet tube 61. The currency is authenticated as described above. If the currency is authenticated, DCR 25 places the currency in money stocks 62 and 63 according to their denomination. It would be apparent to those skilled in act that a drawerless cash register embodiment of the present invention can have as many entry ports and money stocks as required to process any number of different currency denominations. DCR 25 also has a provision to return the change to the customer 64, 65 in such a way that the cashiers do not have to open and close drawers. In this manner, DCR 25 manages the money automatically and safely.

During the currency authentication procedure and as soon as the currency is verified, DCR 25 stores their serial numbers as described above. If the currency is not authenticated, the money is forwarded to an exit 66 as unacceptable.

When returning change to a patron, DCR 25, in one embodiment of the present invention, returns money in a (FIFO) first in first out fashion. That way, DCR 25 can track what money comes in and what goes out for added security. For example, DCR 25 can be used to prevent or indicate the money being removed by force or illegally. For added functionality, DCR 25 can employ a backlight bulb 67 to read the watermark in the currency.

Figure 7:
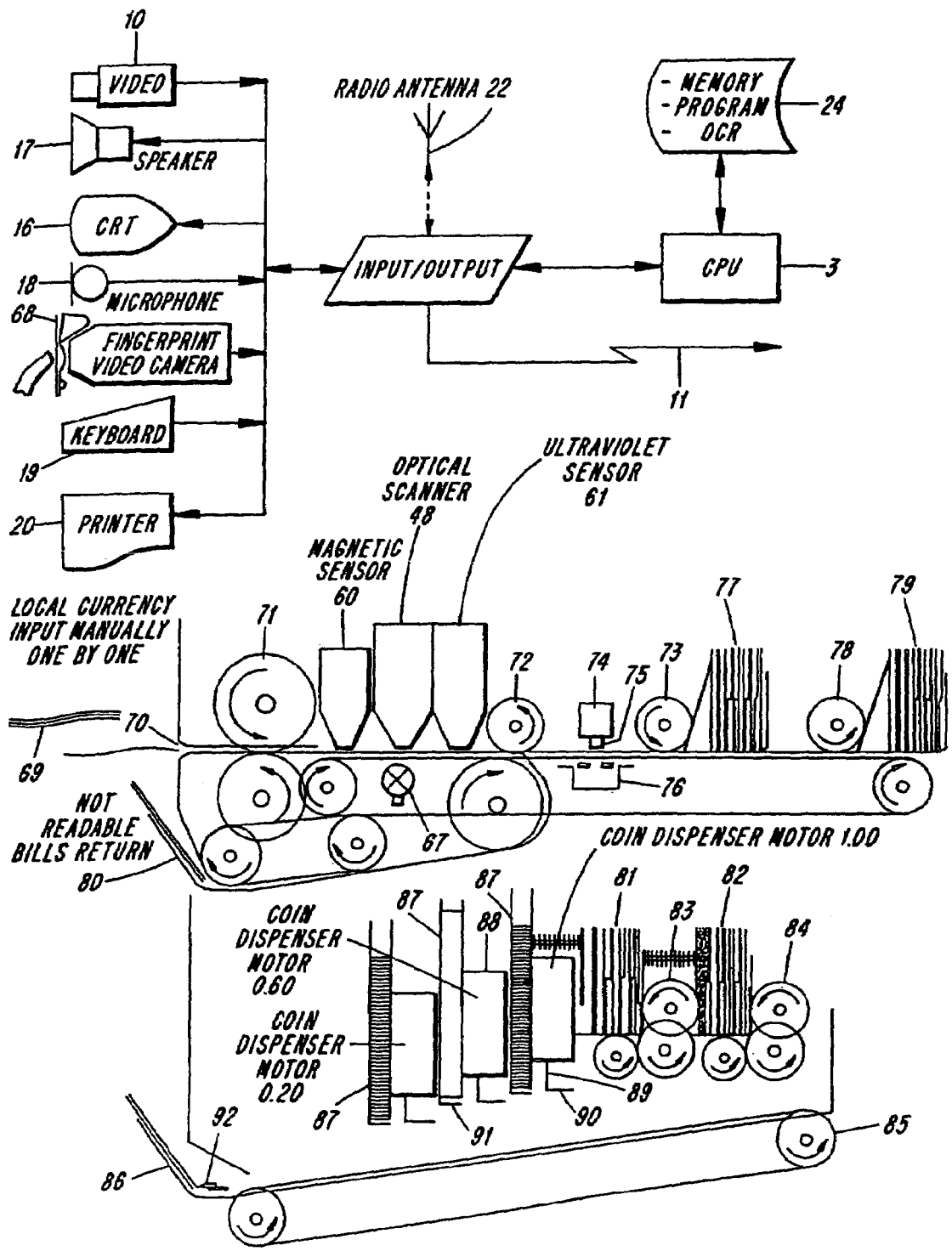
FIG. 7 is a schematic diagram of a Local Currency to Euro Exchange Machine according to an embodiment of the present invention.

FIG. 7 is a schematic block diagram of a Local Currency-to-Euro exchange machine according to an embodiment of the present invention. On the left side is an exemplary customer interface. The customer interface includes a video camera 10, a loud speaker 17, a CRT 16, a keyboard 19, a microphone 18, a printer 20 and a special button for the fingerprint reception 68. The Euro Exchange Machine includes a money entrance port 70, a money exit port 80 and a port for receiving euro 86, and a port for receiving euro coins 92.

In operation, when a patron presses a start button 68, a CPU 3 instructs him through a display 16 and a loud speaker 17 to perform further steps. The patron places his local currency in money entrance port 70. Through a wheel 71, the patron's local currency advances and passes under a magnetic sensor 60, an optical scanner 48, a U/V tube 61, and a watermark tube 67. Using signals from these devices, CPU 3 determines whether the currency is authentic as described above. If the local currency is deemed authentic, a wheel 72 forwards the currency to the wheels 73 and 78. The local currency is then stored in storing stocks 77 and 79 by denomination.

In an embodiment of the present invention, the currency to be exchanged is damaged to render it unusable. Prior to storage, CPU 3 instructs a solenoid 74 through a perforating tool 75 to open a hole in the local currency to render it unusable. The currency can then be discarded. The discarded currency will be collected from the collection bucket 76. The perforation of the currency can be of a different shape for each machine so that it can be recognized easily. The stored, perforated currency can be stored in lower security environment until it is destroyed totally or it may be kept for any other use.

Figure 8:
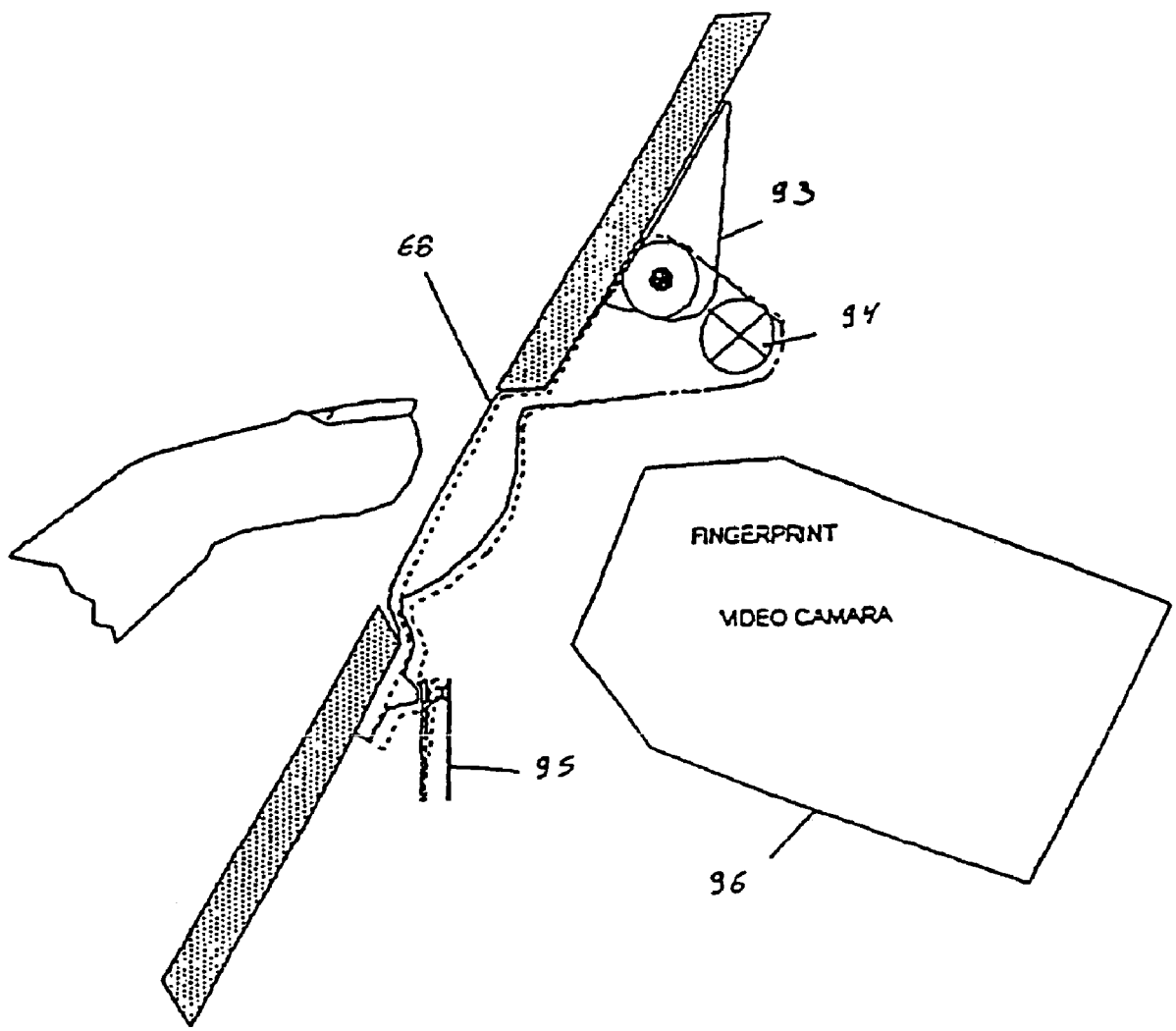
FIG. 8 is a schematic diagram of a Video Fingerprinting System according to an embodiment of the present invention.

Unaccepted currency (i.e., currency that is not authenticated) is returned to the patron through port 80 along with instructions through the display 16 and the speaker 17 indicating the currency was not authenticated. In addition, when the currency is not authenticated, the exchange machine records a picture of the patron. The exchange machine can further instruct the patron to press a button 68. In addition to being a start button, button 68 acts as a triggering mechanism to trigger a fingerprint recording process. As shown in FIG. 8, pressing button 68 causes a switch 95 to start a video camera 96 to record all or a part of the patron's fingerprint. This fingerprint can be incorporated in the video screen 98 as shown in FIG. 9.

The euro exchange machine can also ask the customer if he prefers the return of the non-authenticated currency presently, or he can provide additional information through the keyboard (19) so the system can credit his account as soon as the manual authentication takes place. The data provided by the patron through the keyboard (19) will appear in the screen (98) along with the data provided automatically by the system. Exemplary data is illustrated in FIG. 9. All, or a desired portion, of the data, is stored and transmitted accordingly. If the patron provides the wrong data or flees the scene, the exchange machine follows a program to notify the proper authorities.

It would be well know to those skilled in the art that the patron physical feature capture and storage aspects of embodiments of the present invention can be more or less complex. For example, video camera 96 can analyze the fingerprint image to determine if the print is from a human finger or whether the patron is wearing a glove. In addition, video camera 10 can analyze an image of the patron to determine if the face of the patron is real or covered such as by a mask.

Referring back to FIG. 7, after authentication, perforation and storage of the local currency, the system dispenses the appropriate amount in euros from stacks 81 and 82 through the rubber wheels 83 and 84 and advances the money to a belt 85. Belt 85 then forwards the currency into an exit 86.

It would be apparent to those skilled in the art that the exchange machine can incorporate coin stacks 87. Along with a dispensing motor 88, coin stacks 88 dispense coins. In operation, for each full turn of dispensing motor 88's axle 89, a bracket 90 dispenses a single coin through a slot 91. The dispensed coin moves along belt 85 to a position 92, where it is ready for the patron to collect.

As described above, FIG. 8 is a schematic diagram of a typical video fingerprinting system according to an embodiment of the present invention. A push button 68 is constructed with a transparent material shaped as a magnifying lens in its center. Push button 68 rotates about an axle 93, and is illuminated by a light source 94. When push button 68 is pressed, a switch 95 closes. Closure of switch 95 triggers the logic of the system, which puts into operation a digital camera 96. It would be apparent to those skilled in the art that numerous other procedures, schemes and mechanisms can be employed for the recording of the fingerprint. The video fingerprinting system of embodiments of the present invention is particularly well suited to ATM applications of the present invention.

FIG. 9 is an exemplary screen shot of a video screen for displaying data collected from a patron when currency is not authenticated during a transaction according to an embodiment of the present invention. As shown in FIG. 9, the screen can display a variety of data about a particular transaction, including a picture of the patron 98, a picture of his fingerprint, and certain data provided by the system. Such data can include location as well as data that is voluntarily provided by the patron. The screen can be stored in a memory or can be discarded to save transmission time and memory.

Figure 10:
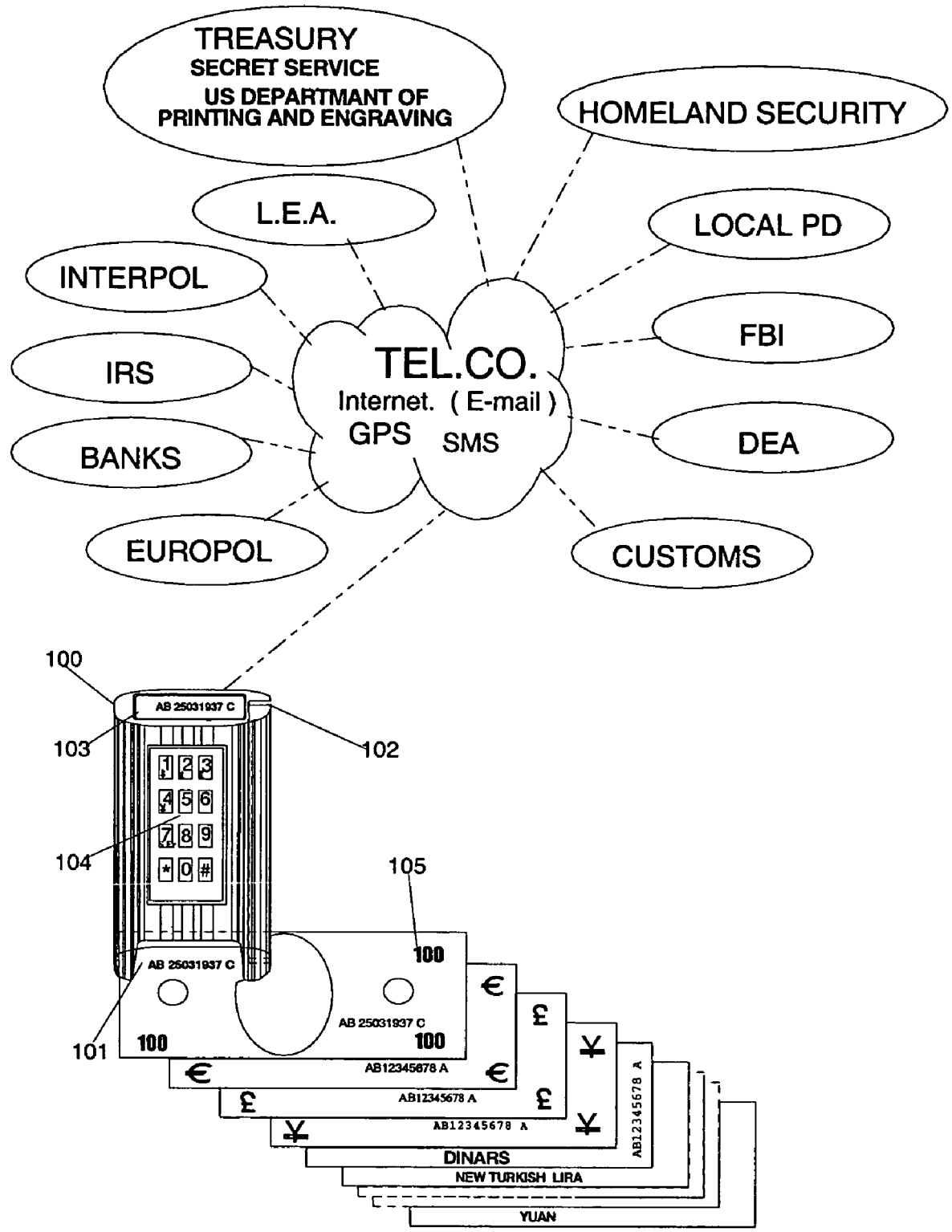
FIG. 10 is perspective view of an exemplary handheld universal currency reader (UCR) according to an embodiment of the present invention.

Another embodiment of the present invention is directed to a handheld universal currency reader (UCR). FIG. 10 is a schematic diagram of a handheld UCR according to an embodiment of the present invention. UCR 100 is preferably configured to read virtually any currency. Handheld UCR 100 preferably uses flash memory technology 108, for example, as employed by digital cameras to store, e.g., millions of characters (text) or thousands of pictures.

Figure 11:
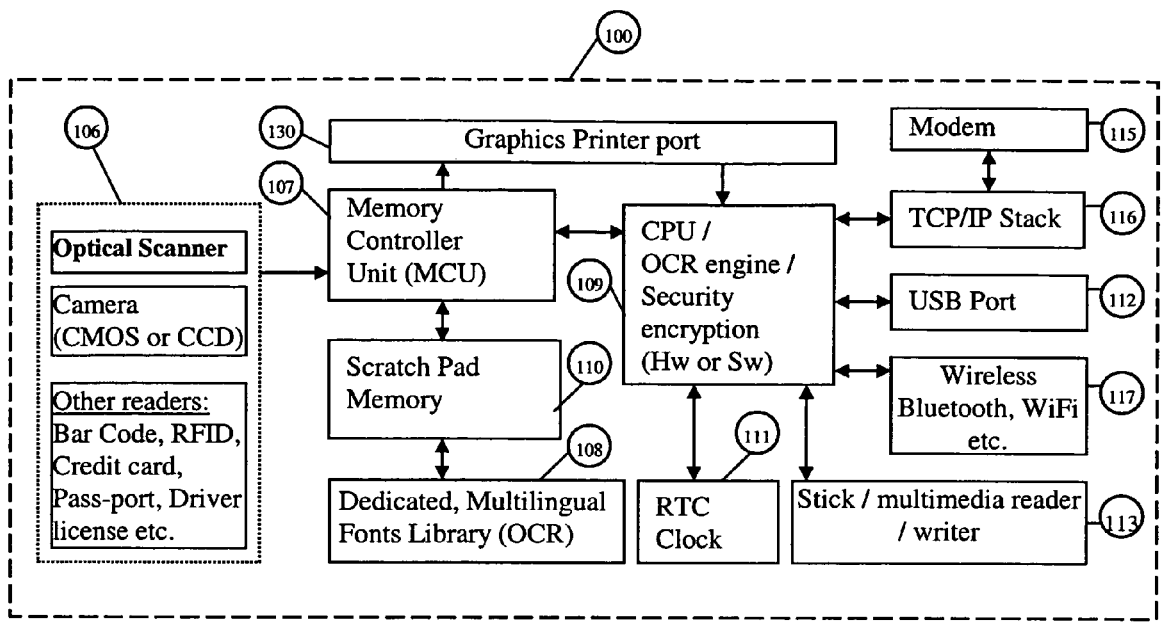
FIG. 11 is a block diagram of a handheld UCR according to an embodiment of the present invention.

Handheld UCR 100 is preferably configured in one of at least two ways: portable or direct connect. In a portable configuration, handheld UCR 100 is set up to operate via wireless connection 117 (see FIG. 11) or can be set up to operate offline. When operating wirelessly, handheld UCR 100 can upload scanned/detected serial numbers and receive real-time alerts for wanted currency or counterfeit currency. When operating offline, handheld UCR 100 is able to store a plurality of serial numbers and wanted currency lists for real time alerts. As shown in FIG. 11, the unit can be connected at a later time either directly via a hardware TCP/IP stack to a LAN 116, the Internet via modem 115, or indirectly—via, e.g., a USB port 12 to a computer or other device. When connected to the network, UCR 100 can send and receive updates to the serial numbers and wanted lists.

In the direct connect configuration, handheld UCR 100 preferably provides the same functionality, described above, as that provided in the portable wireless configuration, except the device is continually connected to a network via, e.g., a USB port. This configuration can be particularly useful in an office setting, a police car, military vehicle, or other location where a network connection may be readily available.

Device 100 also has a credit card reading slot 102 to accept credit cards or passport reading or other data entrance described in the present description. It also has a viewing window 101 that allows the device to be placed correctly over a bill 105 that is being analyzed. Device 100 also has a keyboard 104 to select the type of currency. For example, the type of currency can be selected by pressing a digit on keyboard 104. Device 100 may also have a readout display 103 so that the operator can see the serial number of the bill being examined and have the opportunity to verify the read serial number.

Device 100 includes a camera. The camera images the currency. Using OCR software, device 100 processes the image to obtain identifying information, such as a serial number, associated with the currency. The identifying information can then be stored, transmitted, or manipulated as described above.

The camera also allows more diverse applications for device 100. For example, the camera can be used to take a picture of a car's license plate. The license plate can then be converted to text using OCR software. The text data corresponding to the license plate can be provided to an officer or sent through a communication link to the central office for further processing. Device 100 can also be equipped with a light so the camera can be used in diminished light conditions.

Additional applications for device 100 include reading a utility meter. In such an applications, device 100 can record the consumption of electrical gas or water and, consequently, be used to aid utilities to collect information for billing purposes.

Device 100 can be used to read any string of human readable numbers or alphanumeric characters according to the needs of the user. The device 100 can be connected to various authorities such as Customs, DEA, FBI, Homeland Security, Local PD, L.E.A, Interpol, IRS, Banks, Europol Treasury. The ability of device 100 to communicate with the authorities gives such authorities the opportunity to track and trace wanted currency according to each authority's needs. For example, as described above, the D.E.A. can trace the cash it uses to buy drugs in a sting operation; the F.B.I. can trace cash from armed robberies or extortion; Homeland Security can trace cash used by terrorists; and Treasury can trace counterfeit bills.

FIG. 11 depicts an exemplary block diagram of a handheld UCR 100 according an embodiment of the present invention. A reader 106 scans currency and delivers raw CMYK (cyan, magenta, yellow, and black) data to a memory control unit (MCU) 107. The reader can be any device for that can be used to obtain identifying information from currency. Such devices include optical sensors, cameras (CMOS or CCD), bar code readers, RFID readers, credit card readers, passport readers, and driver license readers. MCU 107 may be associated with its own flash memory 10 and optical character recognition (OCR) engine 109. The MCU 107 may also be connected to a separate flash memory 108 in which the same or different OCR program/database may be stored. In a preferred implementation, a real time clock (RTC) 111 is provided to record a time of scanning or time of program update. When device 100 is not connected via USB port 112, a memory stick 113 is preferably used to store scanned characters, in addition to other data, and to receive and store text from the OCR program. Memory stick 113 can be easily removed from handheld UCR 100.

As will be appreciated by those skilled in the art, handheld UCR 100 provides significant portability possibilities to the functionality of the intelligent currency validation network described herein.

Additional information can be derived using information stored by device 100. For example, if the authorities deem appropriate, a stored picture can be stored and analyzed for statistical purposes such as to find out how many men or women use the machine, ages of users, and the preferred times of operation.

Figure 12:
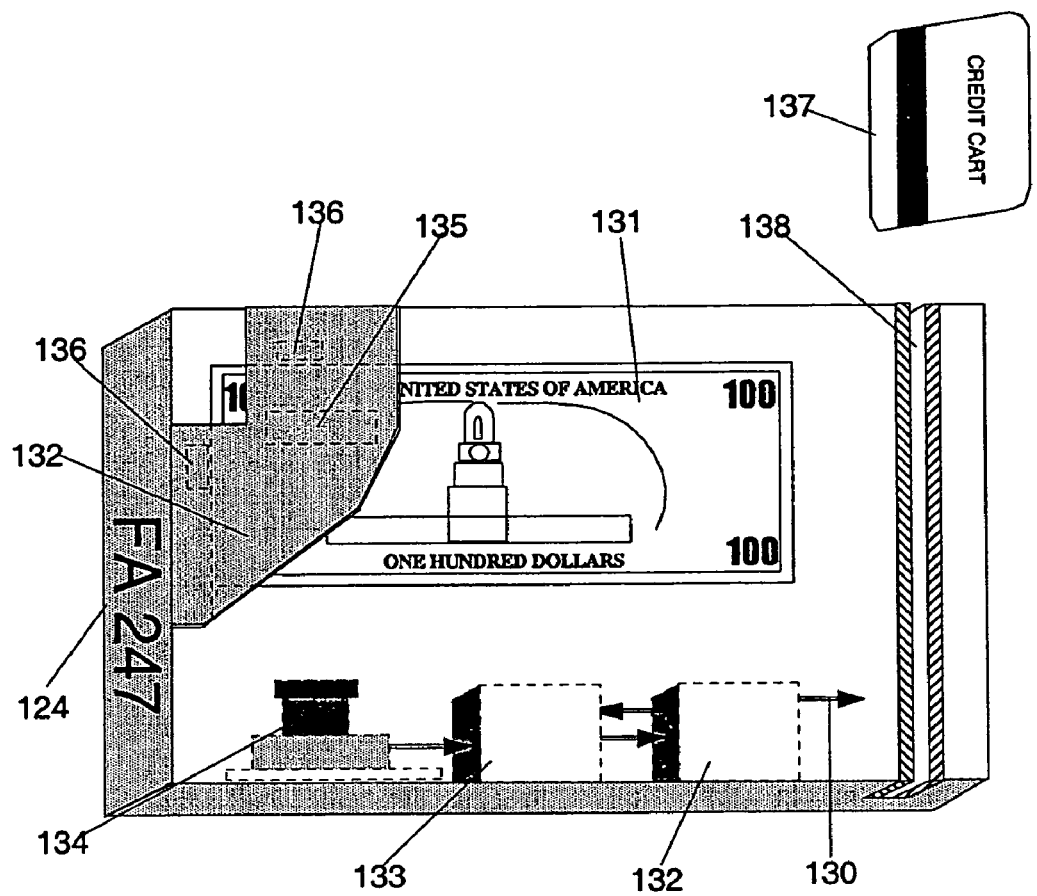
FIG. 12 is a schematic diagram of the Desktop currency reader according to an embodiment of the present invention.
Figure 13:
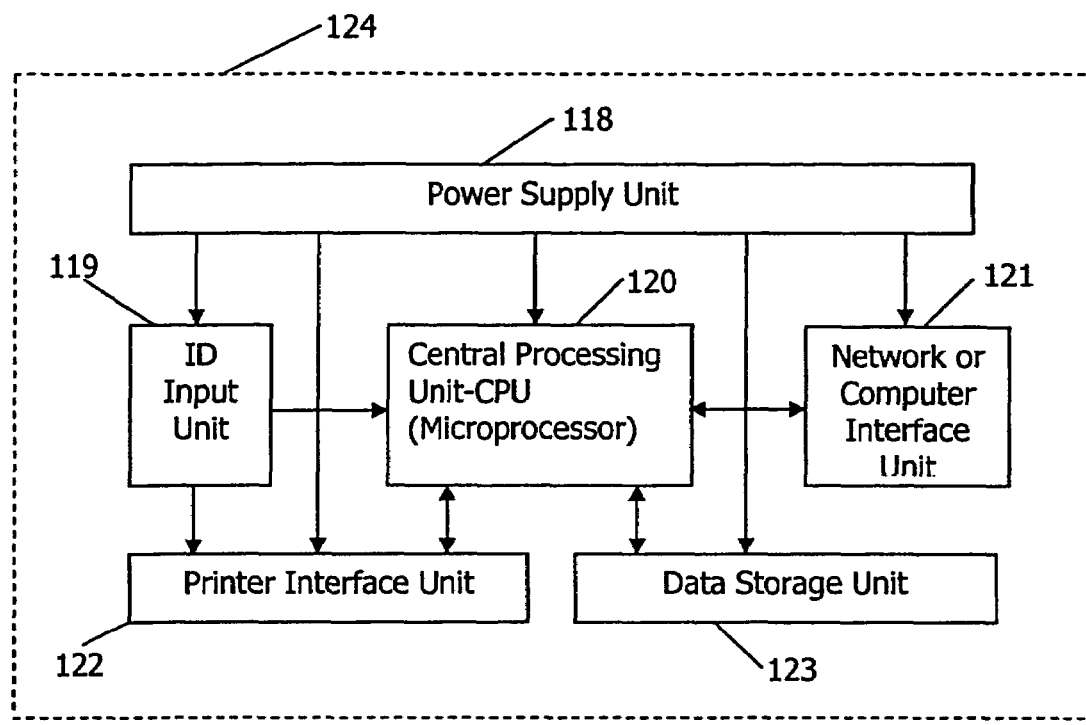
FIG. 13 is a block diagram of a controller to use with a Desktop currency reader according to an embodiment of the present invention.

Another embodiment of the present invention is directed to a desktop currency reader 124. A schematic diagram of a desktop reader 124 according to an embodiment of the present invention is illustrated in FIG. 12. Desktop currency reader 124 is separated into six functional parts to facilitate its description. These parts are depicted in FIG. 13. The core of desktop currency reader 124 is a microprocessor unit 120 and its support circuitry.

In an embodiment of the present invention, microprocessor 120 operates as follows. An ID input unit 119 captures a digital image of unique identification data that exists on a bank note, a check or any other document and converts it to a stream of binary data that can be processed by CPU 120 and/or be printed by a graphics printer via a printer interface unit 122. Configurations of ID input unit 119 according to several embodiments of the present invention are described below. A second alternative input path of data to the CPU 120 is via printer interface unit 122 where, graphic output of the interface is captured and directed towards CPU 120. A third alternative input path for the data to CPU 120 is via a data storage unit 123, that contains either raw data (bit streams or images) or pre-processed data (scratchpad memory). CPU 120 can save the incoming binary data as it is comes in, i.e., as a raw data stream, save the data after partial processing, or save the data after full processing. The data is stored in data storage unit 123.

Data storage unit 123 can be devided logically and/or physically into different partitions. Dividing data storage unit 123 into partitions allows CPU 120 to either resume processing at a later time, or to transmit the data to an output Interface.

Binary input data are processed by CPU 120 to extract the embedded identifying information of the document. Data processing includes OCR software for human readable characters as well as Signal demodulation/decryption for machine readable signals including HID, barcode, magnetic signature/profiles etc.

Part of the processing capabilities of the CPU 120 are not data related. CPU 120 controls all electronic functions including sensing of document edges, defining start and stop of image scanning, framing, and producing delays.

Data can be sent to a graphics or text printer via printer interface unit 122, stored to an external memory (e.g., a memory stick in data storage unit 123) or even transmitted to a network (computer, LAN, WAN, WLAN or the Internet) via a network interface 121.

The power needed for the operation of the CPU 120 is derived from a power supply unit 118. Power supply unit 118 can either be battery operated (using one or more standard or rechargeable batteries), fed from an AC-to-DC unit or powered by the external computer attached to the device—via a USB connector or any other means available. The circuit is built in such a way that power consumption is extremely small so that even with batteries alone, the device has a long useful life away from AC power sources. Keeping the power consumption low has an impact on the size and weight of the handheld UCR 100 because it should be as small and lightweight as possible.

Figure 14:
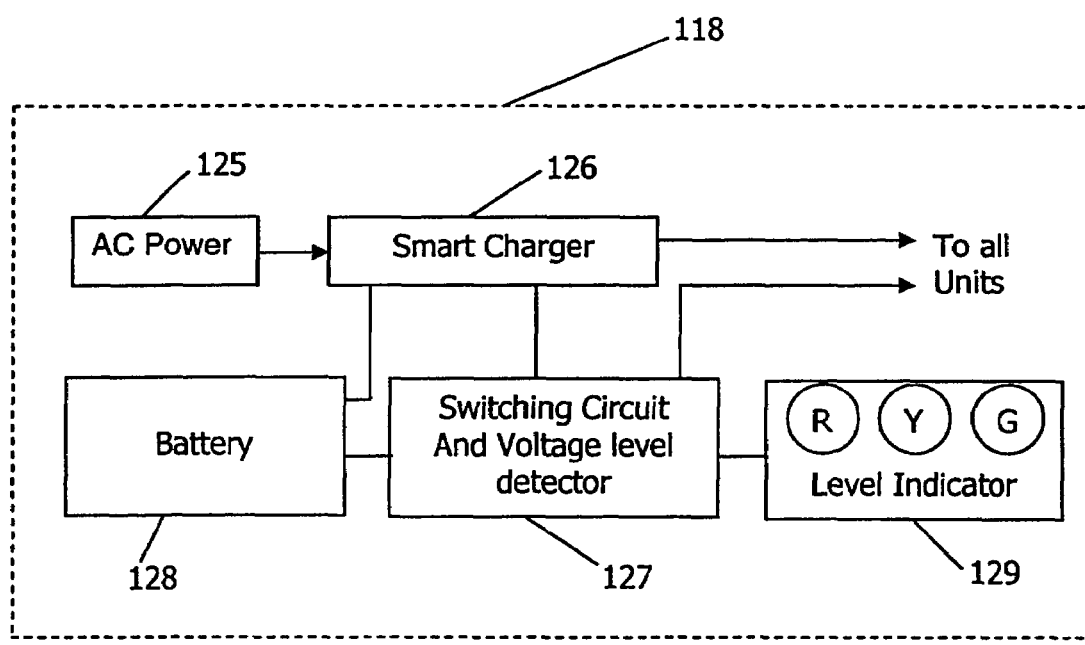
FIG. 14 is a block diagram of a power supply of a Desktop currency reader according to an embodiment of the present invention.

FIG. 14 is a block diagram of a power supply unit 118 according to an embodiment of the present invention power supply unit 118 includes a rechargeable battery 128 with a "smart" circuit 126 that allows feeding the rest of the circuit with power derived from the charging circuit whenever it is plugged to an AC source 125, and using the battery when it is not plugged to an AC source. Which source is used is determined by a switching circuit 127. Power supply unit 118 also includes a set of indicators 129 that indicate when the system needs recharging and also detect when it should switch itself to a standby mode in order to conserve energy.

Returning to FIGS. 12 and 13, ID input unit 119 includes a CMOS camera sensor 132 and a controller 133 that produces a "snap" (stream of binary image data—gray scale or color)

whenever a set of sensors 136 indicates that a bill 131 is located in an appropriate place in front of a transparent window 135. In this example, an MCU of the camera controller circuit 133 stores the image information (raw binary data) in a scratchpad memory 132. ID input unit 119 signals CPU 120 or printer interface unit 122 via a "Data available" signal 130 that a picture is available for processing.

CPU 120 has immediate access to a scratchpad memory 132 of the ID Input unit 1 9. In this way, when signaled (via the Data Available line) that a complete picture resides in memory 132, CPU 120 starts processing the data according to the mode of operation (configuration) CPU 120 is programmed to use.

Configuration of CPU 120 can be pre-programmed, e.g., stored in firmware, and/or set in the configuration cycle of the device and subsequently changed dynamically via commands from the Network/Computer interface unit 121. Exemplary data modes include:

a) Transmit Raw Data Mode

In Transmit Raw Data mode, CPU 120 transmits only the raw picture data to the outside world via the Network/Computer interface unit 121, where the rest of the processing takes place.

b) Transmit Bitmap Data Mode

In Transmit BitMap Data Mode, the raw data are converted to pixels (RGB or Grayscale) and are optionally compressed (JPEG or RLE or PNG compression), before they are transmitted to Network/Computer interface unit 121.

c) Transmit B/W Data Mode

In Transmit B/W Data Mode, the raw data are first converted to pixels and treated with special digital filters to isolate the identifying information from any unwanted background (as is the case with the new 10, 20, 50, and 100 dollar bills as well as many other foreign bank notes). These filters can use pattern matching techniques or RGB to HSV to filtered HSV to RGB transformations. The last stage of the transform operations is a Black and White (B/W) pixel transformation with automatic contrast and edge detection and framing. Transmit B/W Data Mode is an extension of the Transmit Bitmap Data mode described above.

d) Transmit Text Data Mode

Transmit Text Data Mode uses processing similar to that used in Transmit B/W Data Mode described above to convert the picture data to B/W. Framing is performed for individual characters using a small "descriptor" database residing in a non-volatile memory chip inside CPU 120. This "descriptor" database contains information on the general format of the ID. For example, the dollar bill descriptor describes the format of the ID as: a group of two alpha characters that do not contain letter "O", followed by a group of eight numbers and a single character that does not contain "O" but can be a "*". The same chip contains a database with data that can be used by the Optical Character Recognition firmware for all valid characters. Using the OCR firmware, image data are converted to text. The text is then transmitted to Network/Computer interface unit 121.

All above modes (a to d) have a counterpart mode in which CPU 120, rather than transmitting the text to network interface unit 121, stores relevant processed data in external memory, e.g., data storage unit 123. Data storage unit 123 can be one or more of several configurations, including Non-volatile RAM, EPROM, EEPROM, flash memory, memory stick, multimedia storage devices, and USB storage devices.

Similarly, the output of the processed data can be any graphics capable printer, including, for example, a thermal/ dot matrix printer or a windows compatible printer, in which case the information is transmitted to the appropriate printer interface unit 122.

In another embodiment of the present invention, a sensor is configured to directly transmit picture information to a graphics printer. In such an embodiment, CPU 120 can obtain the sensor data this information in encoded form and perform the filtering/framing/OCR operations acting directly on the printer-ready data instead.

Figure 15:
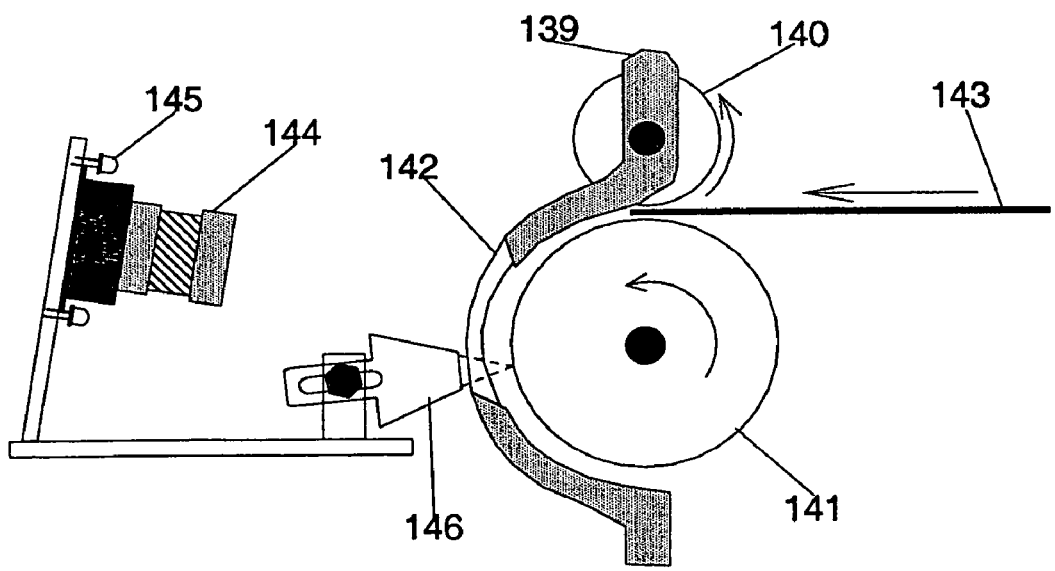
FIG. 15 is a schematic diagram of an apparatus to retrofit existing money counters to read serial numbers according to an embodiment of the present invention.

FIG. 15 is a schematic diagram for a retrofit that can be made in a single pocket currency counter such as is commonly used in banks today. This retrofit allows the counter to obtain an image of a bill and use OCR to obtain a text version of the bill's serial number. In one embodiment of the present invention, retrofit includes:

A CMOS or CCD camera 144 with its controller;

A bright light source 145 (e.g., super bright daylight LEDs because of their tolerance to switching on-off without deterioration to their bright output for extended periods);

A sensor 146 to detect the edge of the bill (e.g., a reflective sensor);

A window 142, (plastic, glass or any other suitable material) covering an opening in the back side of the counter—or in any other appropriate position which gives camera 144 a clear view of the bill 143 as it passes in front of the camera; and Associated electronics (including microproccessor, analog and digital circuitry, and time delays) both for taking a snap of bill 143 and appropriate interface to control the motion of the motor of the machine.

In operation, the currency counter includes a simple DC motor that rotates the existing roller of a counter 141 as shown, dragging a dollar bill 143, and forcing it to pass in front of a camera 144. A roller 140 is allowed to turn only in the direction shown by the arrow, which allows only one bill to be fed at a time.

As soon as bill 143 passes in front of sensor 146, the counter's electronics brake the cylindrical roller 141 until it stops momentarily. At this point, the serial number of bill 143 is visible through window 142. LEDs (145) are lit and the camera 144 is signaled to snap a picture of the dollar and pass it through the controller's interface to the computer of the reading and authenticating device (RAD) illustrated in FIGS. 12 and 13.

It would be apparent to those skilled in the art that there are many ways of improving the reliability and speed of operation of the system. For example, the DC motors can be replaced with stepper motors. Stepper motors are easier to control and stop with a greater precision. Server motors—along with appropriate position indicators are another viable replacement for the DC motor. Further, instead of creating a window on the back support of the roller, the back can be replaced either by a completely or partially transparent back. Counting sensors that already exist in the counter can be used to trigger the camera without the need of an additional sensor (sensor 146) as described above.

Figure 16:
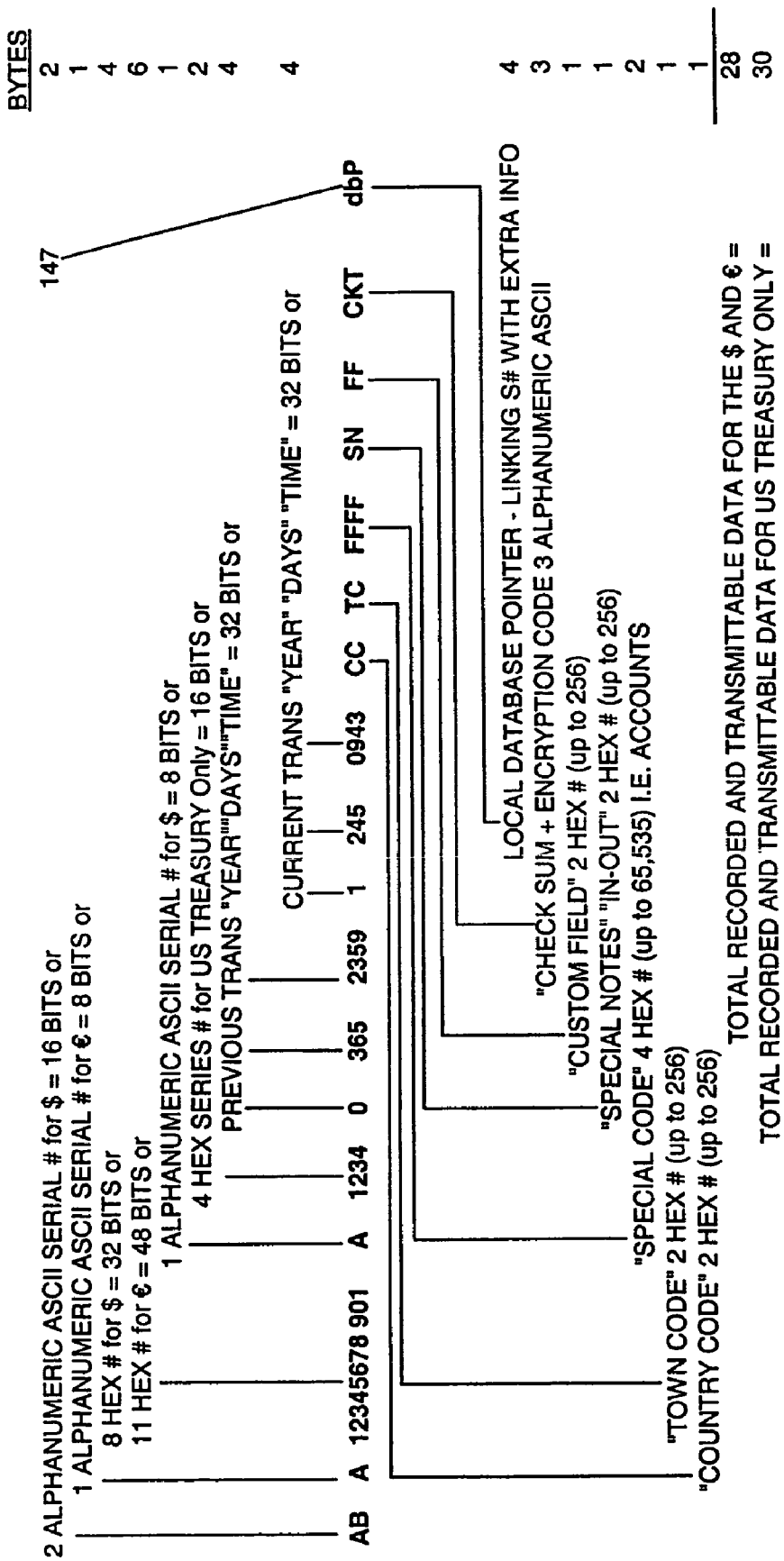
FIG. 16 illustrates a typical format of data transmission including a "TAG" attachment according to an embodiment of the present invention.

FIG. 16 illustrates an exemplary format for a data, stream file to be used in transmitting information according to an embodiment of the present invention. The data stream file includes a typical "TAG" arrangement. To save memory and transmission space, hexadecimal notation is used so each number can be represented by 4 bits instead of 8 bits in of the regular ASCII text notation. This way memory is saved and transmission time is suppressed. Furthermore, with the hexadecimal notation, the data stream is illegible and more difficult for hackers to intervene with. In addition, more sophisticated encoding systems can be used.

The basic structure of the transmission data stream according to an embodiment of the present invention is shown in FIG. 16. The data stream includes the serial number of the currency, special sections of the bill which may be of interest to a special authority such as the U.S. Treasury Department, such as the time of the previous transaction which includes the year, the month, the day, the hour, and the minute of the previous transaction for tracing reasons. The data stream also includes the year, the month, the day, the hour, and the minute of the current transaction followed by a country code (CC), a town code (TC), and a special code of a 4 hexadecimal number which can be used for up to 65,535 account numbers. The data stream can also include a special note (SN) indicating if the bill was in or out of the system. Further, the data stream can includes a custom filled check sum, encryption code, and a local database pointer 147 which links the serial number to a metadata base. Such a link allows many bills to share common data, including, for example, investigator name and phone number, operation name, and place, photographs, passport numbers, and any other data that the agency deems important and necessary.

Figure 17:
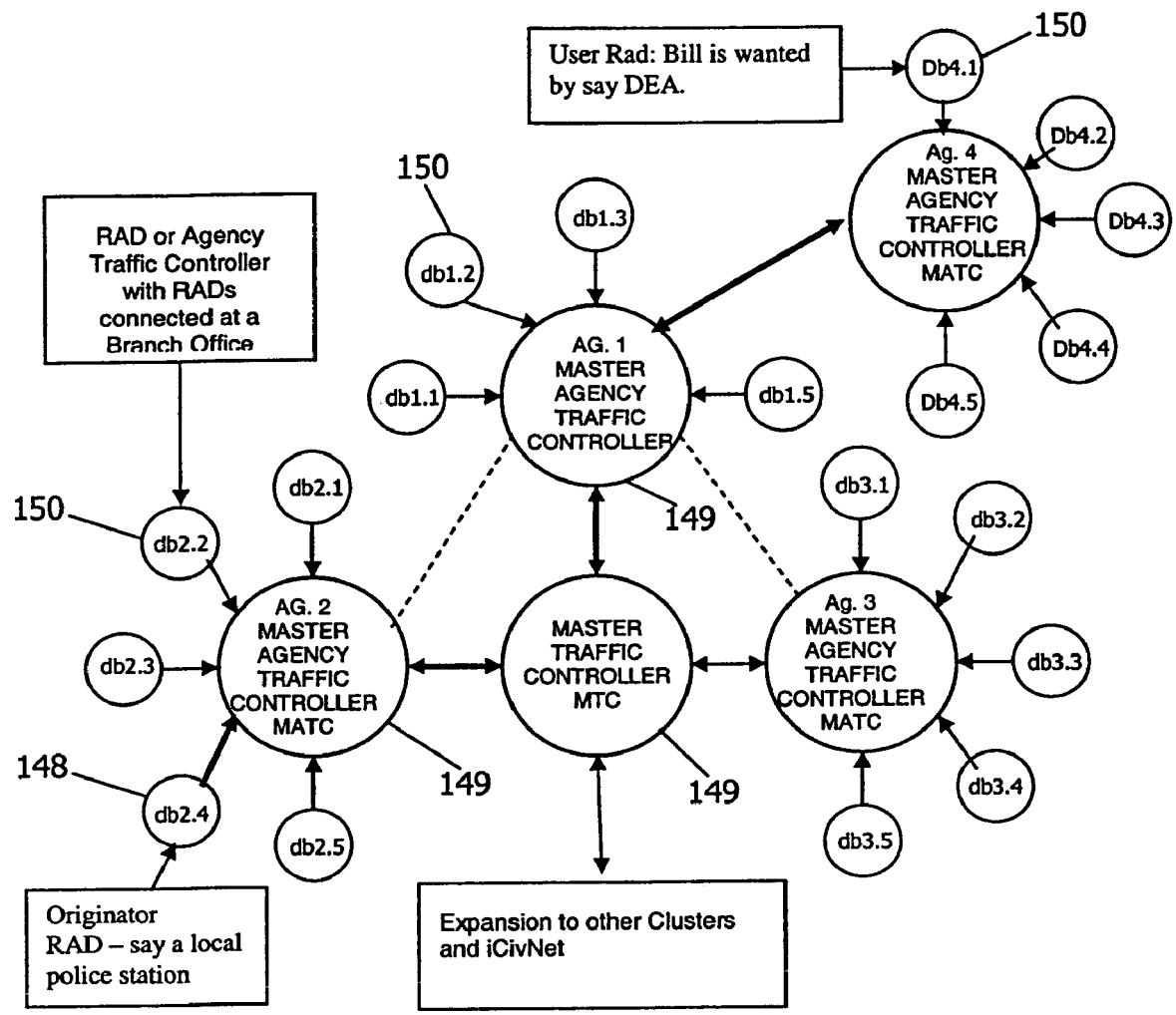
FIG. 17 is a schematic diagram of network design, that allows fast and secure exchange of data between agencies according to an embodiment of the present invention.

An embodiment of the present invention can offer improved networking as shown in FIG. 17. In the exemplary network illustrated in FIG. 17, one server (and its backup images) contains all data. All end users are able to connect and share this data through a structured hierarchy. More configurations can be designed around the concept of tracing banknotes through end user reading and authenticating devices (RADs) all over the world.

An exemplary such design is the intelligent Government Network "iGovNet", specifically designed for allowing government agencies to benefit from all the users of the network without relinquishing the ownership of their data.

The exemplary design here, utilizes the fact that the "TAG" (FIG. 16) that is attached to the serial number of a bill during any transaction, can be used to link to any database through a use of a database pointer assigned at the moment of the transaction.

In this design, each user—or group of users—can maintain a dedicated local network server 150 at a location that is convenient for them and build any kind of configuration for their "internal" LAN. The dedicated server can contain both the tagged money file and the local database at a convenient and physically secure location the user chooses. The dedicated server is connected to a system of "traffic controllers" (TCs) 149. TCs 149 are servers that actually do not have large storage capabilities but can accept and re-transmit data from and to "known" destinations.

As shown in FIG. 17, TCs can be connected in expandable clusters. In FIG. 17, the small circles 150 represent systems with local databases and lists of "wanted" serial numbers belonging to different sections of agencies are connected to the larger circles (TCs 149).

Every time cash appears at a RAD station 150, serial numbers are read and transmitted to the nearest traffic controller. Each TC, retransmits to all its neighbors except the originator 148 and waits for an acknowledgment of receipt for all neighbors before it deletes the transmitting data from its memory. This continues through all connected TCs until every user 150 in the network has received the batch of serial numbers. Every user machine 150 then checks the batch of serial numbers against its own wanted lists. If there is a match, both the end user 151 and the originator of the search are notified. The user can only get Time and Place information of the original transaction, since the database pointer corresponds to a database that belongs to the originator of the search—so if more information is needed, the end user has to contact the originator for more information.

The present example demonstrates several advantages offered by embodiments of the present invention. "Innocent" bills are ignored by the system. As a result, databases are not cluttered with irrelevant information without cluttering space in databases. Moreover, only the interested parties are notified of incidents that concern them—and information is processed effectively.

In addition, the system is economical to build and maintain and also extremely secure, since serial numbers are not intelligence as they travel through the system. They become intelligible only at the place where a match is found, which is secure by definition. Further, the data traveling the system can be heavily encoded by modern secure encryption algorithms. The data also can be built using bit wise manipulations for compactness and speed—and thus not vulnerable to lexical analysis attacks.

In this example, distributing databases to small chunks gives the additional advantage of extremely short sorting and search times.

Another aspect of the pursuit invention is to offer a new and improved optical character recognition (OCR) engine that converts optical or electrical signals to text. The OCR of embodiments of the present invention takes advantage of the specific formats of different currencies in order to be optimized for accuracy.

In one embodiment of the present invention, this is accomplished by using format descriptors and removable internal OCR databases.

Furthermore, the OCR program itself has to be extremely fast, so that the recognition process does not slow down other parts of the software. Further, the OCR program should independent of Operating System functions and graphic routines if it is going to be portable to small devices not always connected to desktop or portable computers.

In order to comply with the above, an OCR software has been designed and will be presented here for demonstration only purposes.

In this exemplary design, the OCR engine (software) is completely designed in assembly language for speed purposes. The system uses an extremely small database of about 800 bytes for both OCR and formatting descriptions.

Special algorithms handle baseline detection and rotation. Removal of background color-noise (especially applicable to new, colorful dollar bills, euros and other foreign currencies) is by using advanced assembler transformations between color spaces like RGB-HSV-RGB-B/W. Geometric transformations are designed for aberrations produced by motion blurring, fish-eye lens effects and distribution of illumination.

Transformations are all optimized through the use of linear, bilinear and polynomial functions, avoiding time consuming trigonometric functions, especially slow in stand alone machines with no floating arithmetic capabilities.

The system can utilize dual scanning wherever applicable (e.g. full face scanners/check verifiers) with a single voting system (automatically comparing the two serial numbers) and three voting system (with human intervention via picture display). The OCR engine includes statistical probabilistic analysis used in conjunction with image processing and pattern recognition, without using vectors, which are too slow for small processors. To compensate for this, the engine revisits similar character decoding (i.e. like C and G) with a secondary, small area (spot) checking and returns both guesses with percentile probability that can be used by the application program to decide when a character or an "unreadable" code will be used.

Figure 18:
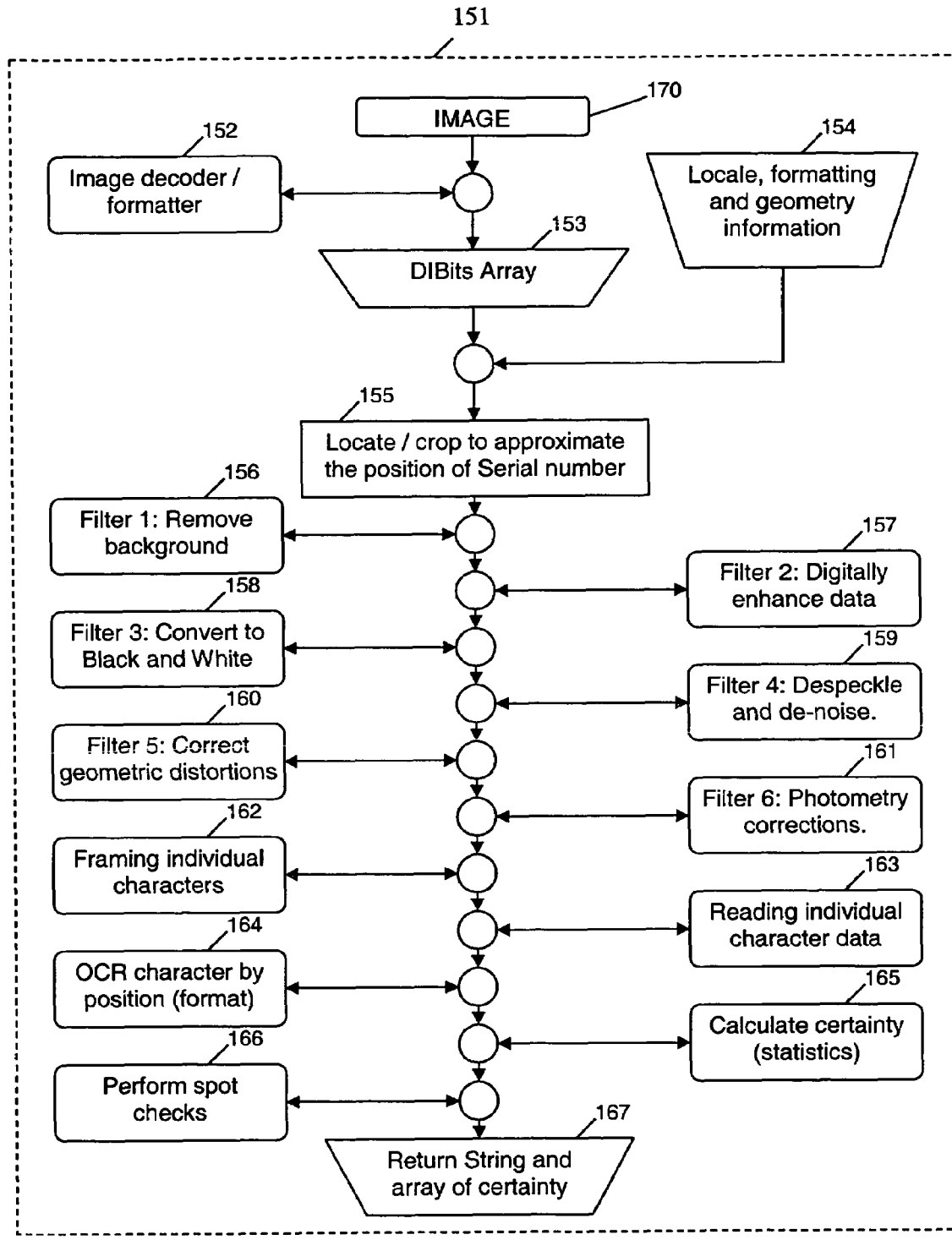
FIG. 18 is a block diagram of an OCR routine according to an embodiment of the present invention.

FIG. 18 is a block diagram of an OCR routine 151 according to an embodiment of the present invention. OCR routine 151 can be executed on a microprocessor or any other processor that can be configured to perform the operations described herein.

OCR routine 151 accepts as an input a "bitmap" picture 170 in form of a byte array similar to the one produced by GetDIBits of "kernel32.dll" of the Windows Operating System. OCR routine 151 has to be aware of certain additional information, mainly about locale and Serial Number formatting for the given country 154. This information is parametric and is supplied either by the installation program and/or the correct settings of the locale information of the operating system when applicable and/or the Windows registry—if available. According to one embodiment of the present invention, the format of the input data is as follows. Since most of the optical devices known (cameras/scanners), do not produce DIBits 153 directly, a small encoder routine 152 is used prior to calling the OCR routine, different for each input image data format (JPEG, RAW, CMYK, EPS etc.)

According to an embodiment of the present invention, the final output of the OCR routine is a string, and an array of long integer numbers 167. According to one embodiment of the present invention, the format of data output by OCR routine 151 is as follows. The output data string represents a series of alphanumeric characters. The format of the string conforms to the acceptable format of the serial number of the currency and/or denomination of a given country. For example, for the U.S., new bills, the string is 'AA NNNNNNN A'. 'A' stands for alpha character from "A" to "Z" except "O" in first position, character from "A" to "L" in second position, character "*" or character from "A" to "Z" except "O" in last position. Similarly, 'N' stands for numeric digit from "0" to "9". The number array returned by the routine has one element per character returned in the string. The value of every element of the array corresponds to the level of certainty that the corresponding OCR-ed digit has been interpreted correctly by the routine. For example using U.S., assuming OCR routine outputs: "AB12345678C" and an 11-value array (100, 90, 92, 88), the array values are interpreted as: probability that "A" is correct=100%, "B" is correct=90%, "1" is correct=92%, . . . , "C" is correct=88%.

Countries other than US need a unicode representation for the returned string. In this OCR, an approach has been adopted where each unicode character is represented by a byte value (retaining the sorting sequence) and is decoded only when the need arises. However, the true unicode representation of the string can be adopted. However, twice the number of bytes to keep the same information are required.

After OCR routine 151 reads the DIBits array 153, it reads country and denomination specific information available in non-volatile memory (or the windows registry, etc.) 154. This information is used to roughly crop the image of the serial number 153, so that the DIBits array is smaller allowing subsequent OCR operations to be more efficient and faster. The OCR routine then calls a series of digital filter routines (156 to 161) that "prepare" the serial number for the actual OCR operations. To facilitate the present description of OCR routine 151, the terms "DIBit data,". "picture," and "image" are used interchangeably in the remainder of the description of OCR routine 151 in FIG. 18, since it is well understood that mathematical operations of digital filters act on bytes.

An important step in recovering a serial number of a banknotes is the 'isolation' of the serial number text from the background. This operation is performed by background removal filter routine 156. Older US banknotes had no significant background but newer ones share the problems that existed with banknotes of other countries, including European Euro bills. The remove background portion of the OCR includes a set of transformations in color space, utilizing hue and saturation values to separate text and noise (background). Although separation impossible using background removal filter routing 156, to enhance accuracy of the OCR, the filtered data are further enhanced by the next filter function.

A common problem with all fast color image capture devices is that whites are not really whites and blacks are not really blacks. That means that all colors must be restored to their proper saturation, brightness, and contrast. A digital filter used in routine 157 works in such a way that it corrects (enhances) the picture of the serial number.

After the enhancement of the serial number image, we use a 'smart' Black and White conversion routine 158 is used, that tries to preserve as much 'color edge' information as possible while minimizing the noise generated from background remnants. The level that defines the conversion is calculated automatically. However, the programmer can fine tune the level for a particular individual denominations by using a formatting information reading routine 154.

Conversion to B/W routine 158 usually leaves behind some noise in terms of speckles or pixel wide lines. This is especially true in the case of really highly saturated backgrounds. These remnants can be largely removed by despeckle and de-noise routine 159. OCR routine 151, can decide when to use the despeckle and de-noise routines. The user can also influence this decision by intervening through function 154.

In certain configurations, characters are distorted due to the fact that bills are not flat and/or are skewed when fed in the counter. The OCR routine 151 has a built in way of detecting skew pictures and can be flagged externally via 154 to correct for curved support. In these cases, a geometric distortion function 160 can rotate the picture at an angle that will correct skewness. In addition, geometric distortion function 160 can use a special transform that will correct 'pitch' or 'punch' distortion as well.

A photometry distance and camera lens correction routine 161 corrects for variable thickness of individual characters, due to light conditions as well as camera response at different angles of incidence. Both conditions make 'central' characters appear thinner than edge characters. In addition, the function of this filter can be controlled through inputs from function 154.

Thus far in OCR routine 151, all filters have worked in synergy so that the picture of the serial number is as uniform, distortion free and sharp as possible. A framing function 162 is an edge detecting routine that returns the position of the four corners of each digit.

The information obtained by function 162 above is used to separate the original DIBits array created at 153 to individual arrays that contain data for only one character at a time. This is performed by reading individual character routine 163.

The main part of the OCR routine 151 is performed in routine. 164. The OCR database, includes relevant data information in an array form that is read here. The format and data of the OCR database are read according to the parameters of the specified locale and language obtained from function 154.

The data bits for each character (obtained by 163), their position in the serial number (obtained in 162) and the contents of the OCR database (164) are fed to the statistical analysis routine 165. In statistical analysis routine 165, three different image-matching routines are used. Each valid character from the database is compared to each individual position of the serial number digit and a value is computed for the "RMS (root mean square) error." The RMS error that can be used to determine both the ASCII (or Unicode) value of the character at each position and the degree of confidence.

There are certain characters that have images with only minor differences: e.g. a capital G and a capital C in US bills differ only by a few pixels. In the case of similar pairs, the statistical analysis routine 165 generates two numbers with almost equivalent degrees of confidence. Spot-checking routine 165 is called whenever statistical analysis routine 165 indicates there may be a similar pairs situation, statistical analysis routine 165 cannot decide which single character it should choose as an output for a given position in the serial number. Special routines are used in 166 to focus attention to the differences of the two specific letters to make the final prediction. For example, in the case of C and G described above, the routine looks for the horizontal line that distinguishes G from a C).

All routines used by OCR routine 151 are CPU intensive, and thus require lots of computations. To minimize the time needed for recognizing a given serial number, special algorithms have been developed that do not use time consuming functions (exponents, square roots, trig functions etc.) but approximate the result with integer arithmetic operations and polynomial series expansions. This allows porting of OCR routine 151 even to simple microprocessors that do not have an FPU for floating point calculations.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device for validating currency, comprising:
an entry port through which currency is entered into the device;
an exit port through which currency is dispensed to a patron;
a scanner for scanning the currency to obtain an image of the currency;
a central processing unit;
a memory coupled to the central processing unit in which a list of identifying information is stored;
software for obtaining identifying information associated with the scanned currency from the image, for comparing the identifying information associated with the scanned currency to the stored identifying information, and for causing a notification if there is a match between the identifying information associated with the scanned currency and the stored identifying information, wherein the identifying information associated with the scanned currency includes a serial number;
a memory coupled to the central processing unit that stores identifying information, including a serial number, of dispensed currency; and
a printer that prints a receipt for the patron, the receipt including the identifying information associated with the dispensed currency,
wherein the printed receipt is provided to the patron substantially concurrently with the dispensed currency.

2. The device recited in claim 1, wherein the scanner comprises a light for illuminating the currency to facilitate obtaining the image, wherein the illumination of the currency by the light is synchronized with the speed of the device so that the currency is properly illuminated.

3. The device recited in claim 2, wherein the currency is paused prior to the illumination of the currency.

4. The device recited in claim 1, wherein the software includes optical character recognition software.

5. The device of claim 4, wherein the optical character recognition software is designed in assembly language.

6. The device recited in claim 1, further comprising a communication port for communicating with a central database to obtain all or a portion of the list of identifying information that is stored in the memory.

7. The device recited in claim 1, wherein the device is an automatic teller machine for dispensing currency.

8. The device of claim 1, wherein the device further comprising: at least one storing stock that stores the currency entered into the device, and the exit port that dispenses one or more of the scanned currency, one or more of a second currency different from the scanned currency, one or more of a ticket, one or more of a vended item, or one or more of a negotiable instrument.

9. The device of claim 1, wherein the device is an automatic teller machine for depositing or accepting currency.

10. The device of claim 1, wherein the device is an automatic teller machine for dispensing one or more of a negotiable instrument.

11. The device of claim 1, wherein the device is an automatic teller machine for depositing or accepting negotiable instruments.

12. A method for validating currency, comprising:
accepting currency through an entry port;
scanning the currency to obtain an image of the currency;
obtaining identifying information associated with the scanned currency from the image, wherein the identifying information includes a serial number associated with the scanned currency;
comparing the identifying information associated with the scanned currency with a previously stored list of identifying information;
providing a notification if there is a match between the identifying information associated with the scanned currency and the stored identifying information;
dispensing the scanned currency to a patron;
storing identifying information, including a serial number, corresponding to each bill of scanned currency dispensed to the patron;
printing a receipt, the receipt comprising the identifying information associated with the dispensed currency; and
providing the printed receipt to the patron substantially concurrently with the dispensed currency.

13. The method recited in claim 12, further comprising illuminating the currency to facilitate obtaining the image, wherein the illumination of the currency is synchronized with the speed of the device so that is currency is properly illuminated.

14. The method recited in claim 13, further comprising pausing the currency prior to illuminating the currency.

15. The method recited in claim 12, further comprising processing the image with optical character recognition software.

16. The method recited in claim 12, further comprising communicating with a central database to obtain all or a portion of the previously stored list of identifying information.

17. A method for dispensing currency to a user, comprising:
dispensing one or more bills of currency to a user;
storing a list of the one or more bills of currency dispensed to the user;
printing a receipt, the receipt including information uniquely identifying at least one or more bills of currency dispensed to the user;
providing the printed receipt to the user substantially concurrently with the dispensed currency; and
reimbursing the user if the one or more bills of currency dispensed to the user are lost or stolen using the information uniquely identifying each of the one or more bills of currency dispensed to the user.

18. A method for dispensing currency to a user, comprising:
dispensing one or more bills of currency to a user;
storing a list of the one or more bills of currency dispensed to the user;
printing a receipt, the receipt including information uniguely identifying at least one or more bills of currency dispensed to the user;
providing the printed receipt to the user substantially concurrently with the dispensed currency; and
removing at least one bill of the dispensed currency from a secure cash list based on the information uniquely identifying the at least one bill of the dispensed currency when the at least one bill of the dispensed currency is used at a currency terminal.

19. A method for dispensing currency to a user, comprising:
obtaining information uniquely identifying each of one or more bills of currency, including a serial number, associated with each bill of currency;
comparing the information uniquely identifying each of the one or more bills of currency for dispensing to the user with a previously stored list of one or more bills of currency, wherein the one or more bills of currency in the previously stored list are each associated with information uniquely identifying the bill and including a serial number;
providing a notification if there is a match between the one or more bills of currency for dispensing to the user and the previously stored list of one or more bills of currency dispensing the one or more bills of currency to a user;
storing a list of the one or more bills of currency dispensed to the user;
printing a receipt, the receipt including information uniquely identifying the one or more bills of currency dispensed to the user; and
providing the printed receipt to the user substantially concurrently with the dispensed currency.

20. The method of claim 19, wherein obtaining information uniquely identifying each of the one or more bills of currency includes:
accepting the one or more bills of currency through an entry port;
scanning the one or more bills of currency to obtain one or more images of the one or more bills of currency; and
processing the one or more images to determine the information uniquely identifying each of the one or more bills of currency.

21. A method for validating currency, comprising:
accepting a first currency through an entry port;
scanning the first currency to obtain an image of the currency;
obtaining identifying information associated with the scanned first currency from the image, wherein the identifying information includes a serial number associated with the scanned first currency;
comparing the identifying information associated with the scanned first currency with a previously stored list of identifying information;
providing a notification if there is a match between the identifying information associated with the scanned first currency and the stored identifying information; and
dispensing one or more items, the one or more items comprising one or more of a second currency different from the scanned first currency;
printing the identifying information associated with the one or more of the second currency.

22. The method of claim 21, wherein dispensing one or more items further comprises dispensing: the scanned first currency, one or more of a ticket, one or more of a vended item, or one or more of a negotiable instrument.

23. The method of claim 21, further comprising storing identifying information, including a serial number, corresponding to the one or more of the second currency.

24. The method of claim 21, further comprising communicating with a central database to obtain all or a portion of the previously stored list of identifying information.

25. The method of claim 21, further comprising printing the identifying information associated with the one or more of the scanned first currency.

\* \* \* \* \*